(12) United States Patent
Cheng et al.

(10) Patent No.: US 11,966,675 B2
(45) Date of Patent: Apr. 23, 2024

(54) SYSTEMS AND METHODS FOR CO-SIMULATION

(71) Applicant: The MathWorks, Inc., Natick, MA (US)

(72) Inventors: Tao Cheng, Brighton, MA (US); Pieter J. Mosterman, Waltham, MA (US); Haihua Feng, Sherborn, MA (US); Fu Zhang, Sherborn, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 17/529,742

(22) Filed: Nov. 18, 2021

(65) Prior Publication Data
US 2022/0075919 A1 Mar. 10, 2022

Related U.S. Application Data

(62) Division of application No. 15/612,501, filed on Jun. 2, 2017, now Pat. No. 11,216,604.

(51) Int. Cl.
| | |
|---|---|
| *G06F 11/07* | (2006.01) |
| *G06F 30/20* | (2020.01) |
| *G06F 30/30* | (2020.01) |

(52) U.S. Cl.
CPC ............ *G06F 30/30* (2020.01); *G06F 11/076* (2013.01); *G06F 11/079* (2013.01); *G06F 11/0793* (2013.01); *G06F 30/20* (2020.01)

(58) Field of Classification Search
CPC ........ G06F 30/30; G06F 30/20; G06F 11/079; G06F 11/076; G06F 11/0793
(Continued)

(56) References Cited

U.S. PATENT DOCUMENTS

| | | |
|---|---|---|
| 7,580,962 B1 | 8/2009 | Orofino, II |
| 7,865,254 B2 | 1/2011 | Gahinet et al. |

(Continued)

FOREIGN PATENT DOCUMENTS

| | | |
|---|---|---|
| EP | 2442248 A1 | 4/2012 |

OTHER PUBLICATIONS

Bouchhima et al., "A SystemC/Simulink co-simulation framework for continuous/discrete-events simulation", 2006, IEEE International Behavioral Modeling and Simulation Workshop, pp. 1-6.*

(Continued)

*Primary Examiner* — Juan C Ochoa
(74) *Attorney, Agent, or Firm* — Cesari and McKenna, LLP; Michael R. Reinemann

(57) ABSTRACT

A model including a first co-simulation component and a second co-simulation component is analyzed. During execution of the model, the first co-simulation component outputs data to the second co-simulation component via a connection. The connection is declared as a continuous-time rate connection for input of the data into the second co-simulation component. Based on analyzing the model, the connection is identified as a discrete-continuous sample time connection based on data being communicated from the first co-simulation component to the second co-simulation component via the connection at a discrete-time rate when the model is executed in a co-simulation manner.

19 Claims, 15 Drawing Sheets

(58) Field of Classification Search
USPC .............................. 703/13–15, 23–25, 27, 28
See application file for complete search history.

(56) References Cited

U.S. PATENT DOCUMENTS

| | | | |
|---|---|---|---|
| 7,877,248 | B1 | 1/2011 | Clune |
| 8,055,494 | B1 | 11/2011 | Clark et al. |
| 8,131,528 | B1 | 3/2012 | Vora et al. |
| 8,209,158 | B1 | 6/2012 | Fielder et al. |
| 8,457,945 | B1 | 6/2013 | Fielder et al. |
| 9,317,331 | B1 | 4/2016 | Koh et al. |
| 9,460,239 | B1 | 10/2016 | Yunt et al. |
| 10,423,732 | B2 | 9/2019 | Zhang et al. |
| 11,042,675 | B2 * | 6/2021 | Feng ..................... G06F 30/20 |
| 11,520,956 | B2 * | 12/2022 | Feng ..................... G06F 30/20 |
| 2010/0063786 | A1 | 3/2010 | Harke |
| 2010/0093301 | A1 | 4/2010 | Lee et al. |
| 2013/0116988 | A1 | 5/2013 | Zhang et al. |
| 2014/0217917 | A1 | 8/2014 | Lam et al. |
| 2017/0061069 | A1 | 3/2017 | Drenth |
| 2018/0349539 | A1 | 12/2018 | Cheng et al. |
| 2019/0370420 | A1 | 12/2019 | Feng et al. |

OTHER PUBLICATIONS

Benedikt, et al., "An Adaptive Coupling Methodology for Fast Time-Domain Distributed Heterogeneous Co-Simulation", SAE Technical Paper SE, Society of Automotive Engineers Warrendale, PA, UA, vol. SP-2272, Apr. 12, 2010, 10 pages.

Benedikt, et al., "Guidelines for the Application of a Coupling Methods for Non-iterative Co-Simulation", 2013 8$^{th}$ Eurosim Congress on Modeling and Simulation, IEEE, Sep. 10, 2013, 16 pages.

Bombino, Massimo, et al., "Heterogeneous Systems Co-Simulation: A Model-Driven Approach Based on SysML State Machines and Simulink," 2010, pp. 1-6.

Deshpande, Prasanna, et al., "MATLAB EXPO 2017: Simulink as Your Enterprise Simulation Platform," Jun. 2017, pp. 1-56.

Extended European Search Report for European Application No. 18000290.9, dated Sep. 3, 2018, 16 pages.

Huang, Edward, et al., "Multi-Fidelity Model Integration for Engineering Design," Elsevier, ScienceDirect, 2015 Conference on Systems Engineering Research, Procedia Computer Science, vol. 44, Mar. 16, 2015, pp. 336-344.

"LabVIEW User Manual," National Instruments, Apr. 2003 Edition, 349 pages (Year: 2003).

Lu, Junzhi, et al., "A Model-Driven Tool-Integration Framework for Whole Vehicle Co-simulation Environments," 8th European Congress on Embedded Real Time Software and Systems (ERTS 2016), Toulouse, France, Jan. 2016, pp. 1-8.

"MiL, SiL, and HiL Applications: ECU Testing and Calibration with GT-SUITE Plant Models," Gamma Technologies, Jan. 2015, pp. 1-2.

Nguyen, Bao, et al., "Co-Simulation of Interconnected Power Electronics Using Simulink-PSpice Interface and Components Defined in C/C++ and SystemC," The MathWorks, Inc., 2016, pp. 1-38.

Nicolescu, G., et al., "Methodology for Efficient Design of Continuous/Discrete-Events Co-Simulation Tools," WMC' 07, Jan. 2007, pp. 172-179.

Otter, Martin, et al., "Functional Mockup Interface—Overview," Modelisar, Jan. 2010, pp. 1-21.

Pohlmann, Uwe, et al., "Generating Functional Mockup Units from Software Specifications," Proceedings of the 9$^{th}$ International Modelica Conference, Munich, Germany, Sep. 3-5, 2012, pp. 765-774.

Schierz, et al., "Co-simulation with communication step size control in an FMI compatible mater algorithm", Proceedings of the 48th Scandinavian Conference on Simulation and Modeling, vol. 76, Nov. 19, 2012, 10 pages.

"Simulink® User's Guide: R2017a," The MathWorks, Inc., Mar. 2017, pp. 1-3856.

"Simulink® User's Guide: R2018a," The MathWorks, Inc., Mar. 2018, pp. 1-4212.

Simulink, "Dynamic System Simulation for MATLAB, Modeling, Simulation, Implementation," User's Guide, The MathWorks, Inc., Version 2.1, Mar. 1992, 516 pages.

Simulink, "Writing S-Functions," The MathWorks, Inc., Version 4, Nov. 2000, 494 pages.

* cited by examiner

600 →

Compute output (Major) at t = 0: {Out1.Y = Integrator.X; sqrt.Y = sqrt(Sqrt.U);}

Discrete state update at t = 0: {}

Continuous state Integration from t = 0 to t = 1

Compute derivatives at t = 0: {Integrator.dX1 = sqrt.Y;}

Integrator.X1 = 0.5 * Integrator.dX1 + Integrator.X;

Compute output (Minor) at t = 0.5: {Out1.Y = Integrator.X1; sqrt.Y = sqrt(Sqrt.U);}

Compute derivatives at t = 0.5: {Integrator.dX2 = sqrt.Y;}

Integrator.X2 = 0.5 * Integrator.dX2 + Integrator.X;

Compute output (Minor) at t = 0.5: {Out1.Y = Integrator.X2; sqrt.Y = sqrt(Sqrt.U);}

Compute derivatives at t = 0.5: {Integrator.dX3 = sqrt.Y;}

Integrator.X3 = 1.0 * Integrator.dX3 + Integrator.X;

Compute output (Minor) at t = 1: {Out1.Y = Integrator.X3; sqrt.Y = sqrt(Sqrt.U);}

Compute derivatives at t = 1: {Integrator.dX4 = sqrt.Y;}

⌐ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
  │ Prediction/Correction for Integrator.dX1, dX2, dX3, dX4 based on derivative history │ ～602
  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

Integrator.X = (Integrator.dX1 + 2.0 * Integrator.dX2 + 2.0 * Integrator.dX3 + Integrator.dX4) / 6.0 + Integrator.X;

Compute output (Major) at t = 1: ….

Discrete state update at t = 1: ….

```
typedef struct {
    void (*logger)(fmi2ComponentEnvironment componentEnvironment, fmi2String instanceName, fmi2Status status, fmi2String category,
        fmi2String message, ...);
    void* (*allocateMemory)(size_t nobj, size_t size);
    void (*freeMemory)(void* obj);
    void (*stepFinished) (fmi2ComponentEnvironment componentEnvironment, fmi2Status status);
    void (*afterComputingDerivatives) (fmi2ComponentEnvironment componentEnvironment, fmi2Status status, fmi2Real *derivatives,
        size_t nDerivatives);
    fmi2ComponentEnvironment componentEnvironment;
} fmi2CallbackFunctions;

fmi2Status fmi2DoStep(fmi2Component c, fmi2Real currentCommunicationPoint, fmi2Real communicationStepSize, fmi2Boolean
noSetFMUStatePriorToCurrentPoint) {
    ModelInstance *comp = (ModelInstance *)c;/* cast void* to ModelInstance* */ fmi2CallbackFunctions cb = comp->callbacks;
    double h = communicationStepSize / 10; /* break macro step into 10 substeps */
    ...
    double derivatives[NUMBER_OF_STATES];
    ...
    for (int k = 0; k < 10; k++) {
        comp->time += h;
        for (int i = 0; i < NUMBER_OF_STATES; i++) {
            fmi2ValueReference vrDX = vrDerivatives[i];
            derivatives[i] = realVariables[vrDX]; /* compute derivatives */
        }
        if (cb->afterComputingDerivatives != NULL) {
            cb->afterComputingDerivatives(comp->componentEnvironment, fmi2OK, derivatives, NUMBER_OF_STATES); /*
master execution engine modifies the buffer */
        }
        for (int i = 0; i < NUMBER_OF_STATES; i++) {
            fmi2ValueReference vrX = vrContinuousStates[i];
            realVariables[vrX] += h * derivatives[i]; /* forward Euler step*/
        }
        ...
    }
    ...
}
```

FIG. 7

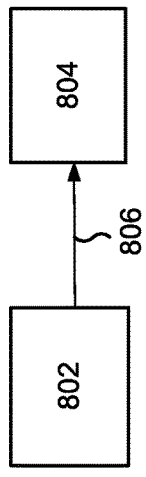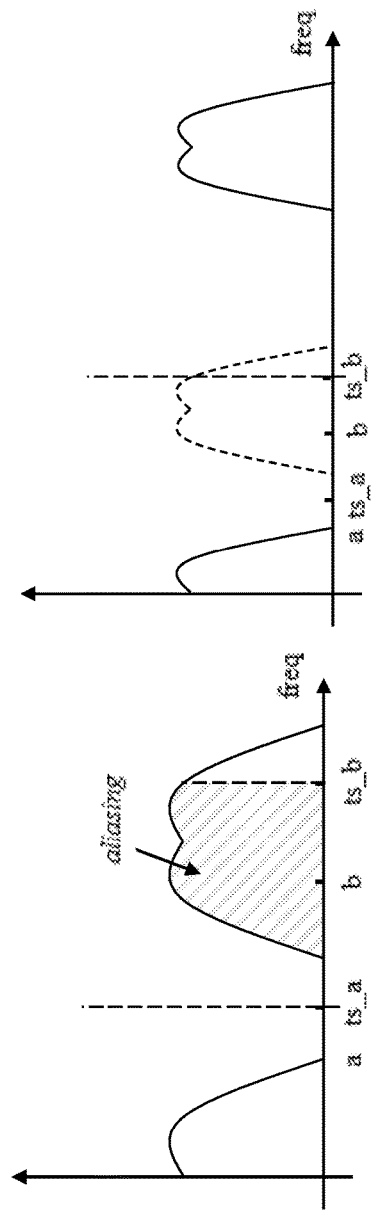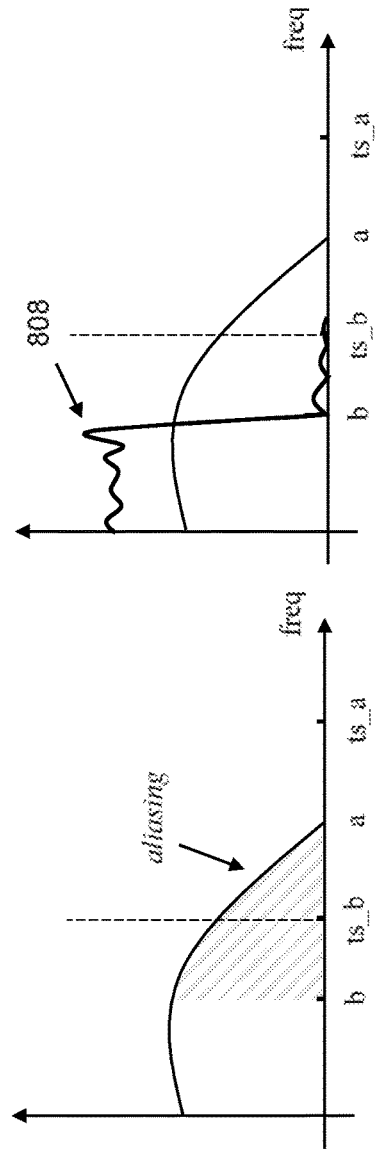

SYSTEMS AND METHODS FOR CO-SIMULATION

CROSS-REFERENCE TO RELATED APPLICATIONS

This application is a divisional of application Ser. No. 15/612,501 filed Jun. 2, 2017, now U.S. Pat. No. 11,216,604, for SYSTEMS AND METHODS FOR CO-SIMULATION, which application is hereby incorporated by reference in its entirety.

BRIEF DESCRIPTION OF THE DRAWINGS

FIG. 6 is a diagram of an example implementation of a calling sequence used in FIGS. 5A-5C for implicit compensation;

FIG. 7 is a diagram of an example implementation of a callback mechanism for the implicit compensation;

FIGS. 8A-8E are diagrams of an example implementation of data coupling compensation for a frequency domain;

COPYRIGHT NOTICE

Figure 1:
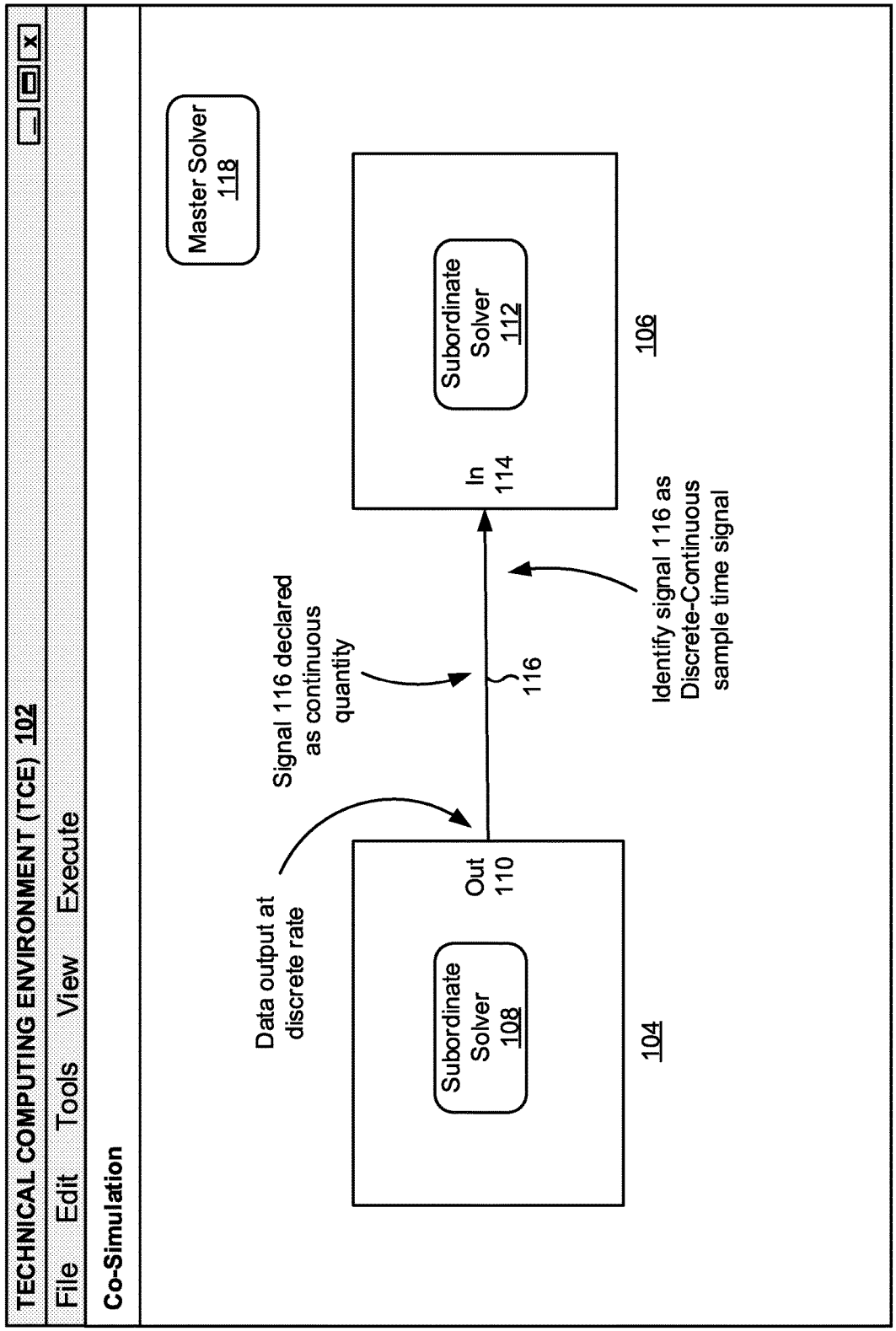
FIG. 1 is a diagram of an overview of an example implementation that automatically identifies a continuous-time signal that is discretized due to co-simulation.

A portion of the disclosure of this document contains material that is subject to copyright protection. The copyright owner has no objection to the facsimile reproduction by anyone of the patent document or the patent disclosure, as it appears in the Patent and Trademark Office patent file or records, but otherwise reserves all copyright works whatsoever.

DETAILED DESCRIPTION

The following detailed description of example implementations refers to the accompanying drawings.

In a Technical Computing Environment (TCE), a model of a system may be constructed by combining a set of model components. The TCE may include an execution engine (e.g., in the form of a software application or component) that executes the model to simulate or generate a behavior of the system. The modelled system may include an electrical system (e.g., circuit boards, electric motors, processors, etc.), a mechanical system (e.g., springs, machinery, etc.) and/or other physical systems. The execution engine may execute the model using one or more solvers, e.g., that implement numerical integration algorithms that compute system dynamics over time using information contained in the model.

In some implementations, co-simulation is used to execute a model that includes model components that are solved using different solvers, e.g., solvers of different types or solvers of the same type. The different solvers can implement the same algorithm or different algorithms. The solvers can be included in the same execution engine or different execution engines. In some implementations, co-simulation can take place using one single execution engine or multiple execution engines of the same or different software applications.

An execution engine that executes the model may control the exchange of data between the model components that use different solvers. For the purpose of simplicity, model components in co-simulation are also referred to as co-simulation components. The execution engine may communicate with co-simulation components via interfaces for the co-simulation components, and the execution engine may only have access to content and functionality of a respective co-simulation component that is available via an interface (e.g., a Functional Mock-Up Interface (FMI), S-Function interface, Application Programming Interface (API), etc.) for the co-simulation component.

Co-simulation differs from conventional simulation that uses a single solver to solve each component included in the model. In conventional simulation, the same solver may be used when an execution engine has access to all content and functionality of model components and is capable of executing the model so that the model is executed as a single cohesive model. However, a model that uses multiple solvers to execute different portions of the model cannot be executed in the conventional manner and may require co-simulation.

In co-simulation, a model may be simulated using multiple execution engines or multiple solvers of the same execution engine. For some models, co-simulation components may require different execution engines in addition to different solvers. Co-simulation may be used to execute these models such that co-simulation components that require different execution engines and different solvers are executed/solved and communicate data with one another in the model. In such cases, the TCE can implement a master execution engine and a master solver to drive execution of the model and the co-simulation components. A co-simulation component may be executed using a subordinate execution engine that is the same as or that is different than the master execution engine. As used herein, the term "subordinate execution engine" refers to an execution engine (e.g., a different execution engine than the master execution engine) that interfaces with the master execution engine. The term "subordinate solver" refers to a solver used by the subordinate execution engine and/or a solver used by the master execution engine, which differs from the master solver, to perform solving for the co-simulation component. Accordingly, while the subordinate execution engine and/or subordinate solver may be used to execute a respective co-simulation component, the master execution engine is used to interface with the subordinate execution engines and/or subordinate solvers for the co-simulation components and to communicate data between co-simulation components during execution of the model in a co-simulation manner. Additionally, or alternatively, different execution engines used in co-simulation may progress independently (e.g., in physical time as opposed to logical time) and exchange data at a particular communication rate.

In co-simulation, the data exchanged between co-simulation components is restricted to discrete-time communication rates even though the connection between co-simulation components may be modeled at a sample rate that differs from the communication rate at which data is actually exchanged in the model. Co-simulation may be especially challenging when the connection is intended to be modeled at a continuous-time rate (e.g., the connection is declared as continuous-time in the model). As used herein, continuous-time refers to a connection that is intended to have or represents a value that varies continuously with time but may in fact be discretized by a solver in order to be solved. This value may approximated by a solver (e.g., a subordinate solver) at various intermediate points within a time step based on a numerical integration scheme to approximate the continuous-time. Such discretization and approximation for continuous-time is separate from the discretization that co-simulation introduces to the connection between co-simulation components. When such a model is executed in a co-simulation manner, the communication rate for the connection in the co-simulation may not be the same as the modeled-sample rate for the connection in the model (e.g., that would be modeled if co-simulation was not used).

The data exchanged and the connections may take different forms. For example, the connection may be a signal, a power connection, an energy exchange, a non-causal connection, etc. and the data exchanged may represent pressure, voltage, etc. By way of example, the connection between co-simulation components will be described in the present application as a signal. However, it should be understood that other forms of connections may be used instead of signals throughout the application where signals are used as an example.

As previously discussed, a signal from a co-simulation component that is declared to have a modeled sample rate (e.g., a continuous-time rate or a discrete-time rate) in the model may be discretized based on the communication rate set for the co-simulation framework. For example, while the signal may still be a continuous-time signal from a user's perspective (e.g., a signal representing pressure that changes over time or voltage that changes over time), because execution of the model is restricted to discrete communication times in co-simulation, the signal is not simulated as a continuous-time signal as the user expects.

The co-simulation framework artificially changes properties of the model that cause the discrete communication times between co-simulation components, and which can lead to inaccuracies or errors/approximations in the simulated behavior of the system. For example, an output of a co-simulation component may be artificially sampled and held before being communicated to another co-simulation component. Because of the artificial sample and hold, a communication of data via the signal between connected co-simulation components may have a discrete-time communication rate that is different from the continuous-time modeled sample rate or the discrete-time modeled sample rate declared for the signal between the co-simulation components in the model. This difference in the communication rate of data between co-simulation components and the modeled sample rate (e.g., a continuous-time modeled sample rate or a discrete-time modeled sample rate) declared for the connection may cause data generated by a co-simulation component at particular time steps to be lost, unavailable, delayed, or inaccurate. These errors may confuse a user who set a signal to be continuous-time or discrete-time but is actually modeled at a different rate that is due to the model being executed in a co-simulation framework.

Implementations described herein may automatically (e.g., independent of user input) identify one or more discrepancies between a sample rate of a connection between co-simulation components and the communication rate of the connection set for the co-simulation. For example, implementations described herein may automatically identify continuous-time signals that are discretized because of the co-simulation framework. In some implementations, a graphical representation of this connection (e.g., a signal line connecting the co-simulation components) may be visually distinguished from other graphical representations of communication in the model. Accordingly, a user may be presented with a visual indication that a declared modeled sample rate (e.g., a continuous-time rate or a discrete-time rate) for the communication between co-simulation components is artificially discretized in co-simulation and/or may result in inaccuracies in the simulated behavior of the system.

Some implementations described herein may compensate for the inaccuracy caused by co-simulation. For example, implementations described herein may determine a compensation location in the model and insert a compensator (e.g., an algorithm for compensating for an error occurred during execution of the model in connection with executing the model in a co-simulation manner) at the compensation location to compensate for the error. The compensator may be inserted between two co-simulation components in a model (which for the purpose of simplicity, this scenario is referred to as explicit compensation) or inside a co-simulation component (which for the purpose of simplicity, this scenario is referred to as implicit compensation). A compensator may be inserted into the model by the solver and/or execution engine implementing an algorithm using inputs/outputs or other info available at the compensation location. The insertion may be physical to the model for showing the user (e.g., displayed in the model as a block), or may be virtual such that the user does not receive an indication that the compensator is applied and/or inserted in the model.

In some implementations, an interface extension (e.g., an API extension) for an interface of a co-simulation component is also provided that allows a callback to be included in functionality of the co-simulation for implicit compensation. In some implementations, the ability to perform implicit compensation by inserting the compensator inside a co-simulation component may provide a more accurate simulated behavior when the model is executed than if the compensator is inserted outside of the co-simulation component.

Additionally, or alternatively, implementations described herein may dynamically control a step size at which the model communicates data (e.g., the communication rate for the connection in co-simulation) between co-simulation components based on a sensitivity analysis of the model.

FIG. 1 is a diagram of an overview of an example implementation 100 described herein that automatically identifies a continuous-time signal that is discretized due to co-simulation.

In some implementations, when the model is created, a user may specify modeled sample rates for the elements of the model (e.g., blocks, lines, ports, etc.). The user may specify modeled sample rates for all of the elements, some of the elements, and/or set a global modeled sample rate for the model. In such cases, a TCE, or an execution engine thereof, may automatically set the modeled sample rates for elements not specified by the user based on relationships between the elements and the semantics of the model to ensure a consistent and executable model. Accordingly, even if the user does not declare a modeled sample rate for a signal between two components or elements of a model, the signal may inherit or be automatically set with a modeled sample rate (e.g., a continuous-time rate or a discrete-time rate).

TCE 102 may partition the model, automatically and/or based on user input, to put different elements of the model into different co-simulation components 104 and 106. For example, elements that use a same solver may be partitioned into a same co-simulation component, and elements that require different solvers may be partitioned into different co-simulation components. Co-simulation components 104 and 106 may each include one or more of the model elements.

Co-simulation component 104 may be solved using a subordinate solver 108, and co-simulation component 106 may solved using a different subordinate solver 112, of the same execution engine or of a different execution engine. Co-simulation components 104 and 106 may be visually represented by one or more blocks or other graphical model elements. Signal 116, which is output by output port 110 of co-simulation component 104 and input into input port 114 of co-simulation component 106, may be visually represented by a signal line in the model.

When executed, the model illustrated in FIG. 1 may simulate, for example, the behavior of a car, and co-simulation components 104 and 106 may represent different parts of the car that are simulated using different simulation tools (e.g., different execution engines or software applications). TCE 102 may interface with the different software applications to execute functionalities for the respective parts of the car to execute the model in a co-simulation manner. Alternatively, TCE 102 can also implement one software application and simulate parts of the model using different execution engines within the same software application.

A master execution engine of TCE 102 (e.g., a Simulink® execution engine), which uses a master solver 118, may analyze the model to determine properties of signal 116 and co-simulation components 104 and 106. The signal properties may include a time domain (e.g., a continuous-time signal that represents a physical quantity, a discrete-time signal, etc.), a frequency domain, and/or user specified information (e.g., a user specified moving average filter). For example, the modeled sample rate of signal 116 may be obtained by the master execution engine based on the modeled sample rate set for signal 116 when the model was created or compiled.

TCE 102 may analyze co-simulation components 104 and 106 via respective interfaces and obtain co-simulation component properties. The interface may be an FMI or an S-function API. In some implementations, the S-function API includes a calling syntax used by system-functions (e.g., S-functions) in Simulink® that enable interaction with the Simulink® execution engine.

TCE 102, when analyzing a co-simulation component via an interface, may obtain information about properties of co-simulation components 104 and 106. For example, this information may be obtained via a JavaScript Object Notation (JSON) interface. Additionally, or alternatively, this information may be obtained from a file (e.g., an extensible markup language (XML) file) for the co-simulation component. The information can indicate properties and/or capabilities of the co-simulation component, e.g., characterized by flags or other mechanisms. For example, the information may indicate a type of port (e.g., a derivative input port), a use of variable communication step sizes, or higher order signal extrapolation, or other properties. The interface for a co-simulation component may provide information regarding properties of the data input and/or output of a co-simulation component to the master execution engine. The properties of co-simulation components 104 and 106 may be set based on user input and/or from a co-simulation architecture (e.g., by directly adopting values set in the architecture, analyzing computational resources and setting properties based on the capabilities of the computational resources (e.g., available memory, processing speed), etc.).

In some implementations, the communication rate for signal 116 may be determined based on user input. In some implementations, the communication rate for signal 116 may automatically be determined by the master execution engine. For example, the communication rate may be based on the properties of co-simulation components 104 and 106 (e.g., sample rates set for output port 110 and input port 114 for signal 116).

Additionally, or alternatively, the communication rate for signal 116 between the co-simulation components 104 and 106 may be automatically determined by the master execution engine based on the modeled sample rate for signal 116. For example, the communication rate may be set equal to the modeled sample rate of the signal. In some implementations, the interfacing required to communicate between subordinate solvers 108 and 112 in co-simulation may require a communication rate different from the modeled sample rate. For example, assuming signal 116 is set to have a continuous-time modeled sample rate, the communication rate cannot be set to match because the continuous-time modeled sample rate (e.g., a discrete rate based on the step size of a numerical integration scheme used to model the continuous-time) may be higher than the discrete communication rate possible for communication between co-simulation components 104 and 106. As another example, assuming signal 116 is set to have a discrete-time modeled sample rate, the communication rate may be set to be a multiple of the discrete-time modeled sample rate when the processing resources do not support a communication rate as fast as the modeled sample rate.

In FIG. 1, assume the master execution engine determines that signal 116 is a continuous-time signal (e.g., a continuous-time modeled sample rate) based on the modeled sample rate indicating the signal is declared as a continuous-time quantity. Assume, the master execution engine also determines that data is actually communicated via signal 116 at a discrete-time rate based on the communication rate. Accordingly, co-simulation component 106 will identify signal 116 as a continuous-time input even though signal 116 communicates data at a discrete-time rate in co-simulation. Therefore, finer details of the data generated by co-simulation component 104 at intermediate time steps smaller than the discrete-time communication rate may not available to the model and/or not communicated to co-simulation component 106 at the intermediate time steps. For example, information about a derivative value in-between two communication times may be communicated at a later communication time. The information may be stamped to indicate at what time in-between the communication times the derivative was valid.

The master execution engine may identify signal 116 as a discrete-continuous sample time signal based on signal 116 being declared as a continuous-time quantity (e.g., a continuous-time modeled sample rate) but only actually exchanging data at a discrete-time communication rate.

Automatically identifying signal 116 as a discrete-continuous sample time signal (e.g., a signal having a modeled sample rate that is different than a communication rate) between two co-simulation components presents new opportunities to improve the model and/or execution of the model. For example, the master execution engine may change a visualization of the signal line representing the discrete-continuous sample time signal and/or compensate for the error caused by the discrete-continuous sample time signal as will be discussed in more detail with respect to FIGS. 3-10.

Figure 2:
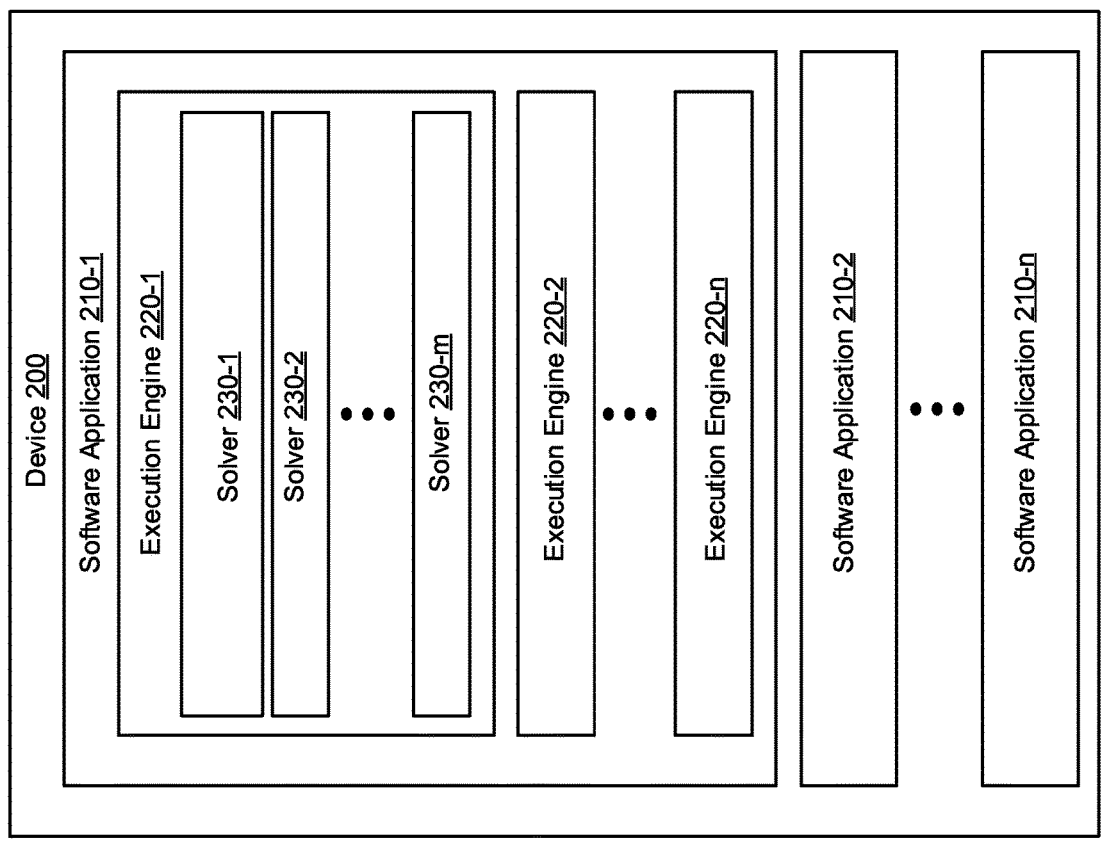
FIG. 2 is a diagram of an example software architecture in which systems and/or methods, described herein, may be implemented.

FIG. 2 is a diagram of an example software architecture in which systems and/or methods, described herein, may be implemented.

As shown in FIG. 2, a device 200 may store and/or execute software applications 210-1 to 210-n that may each include a TCE to create and/or execute a model. Each software application may include one or more execution engines used to execute the model. For example, software application 210-1 may include execution engines 220-1 to 220-n. Each execution engine may include one or more solvers. For example, execution engine 220-1 may include solvers 230-1 to 230-m.

In co-simulation, a software application, execution engine, and solver may be responsible for executing a particular co-simulation component. The particular co-simulation components are mapped to different solvers and may be mapped to different software applications and/or execution engines. For example, in FIG. 1, master solver 118, subordinate solver 108, and subordinate solver 112 may all share a same execution engine (e.g., execution engine 220-1) and a same software application (e.g., software application 210-1). Alternatively, master solver 118, subordinate solver 108, and subordinate solver 112 may not share an execution engine and/or a software application. For example, master solver 118 may be included in execution engine 220-1 and software application 210-1; co-simulation component 104 may be mapped to a solver included in execution engine 220-2 and software application 210-1; and co-simulation component 106 may be mapped to a solver included in an execution engine of software application 210-2. Co-simulation uses interfaces for the solvers to allow communication between these solvers so that the model may be executed.

As indicated above, FIG. 2 is provided merely as an example. Other examples are possible and may differ from what was described with regard to FIG. 2.

Figure 3:
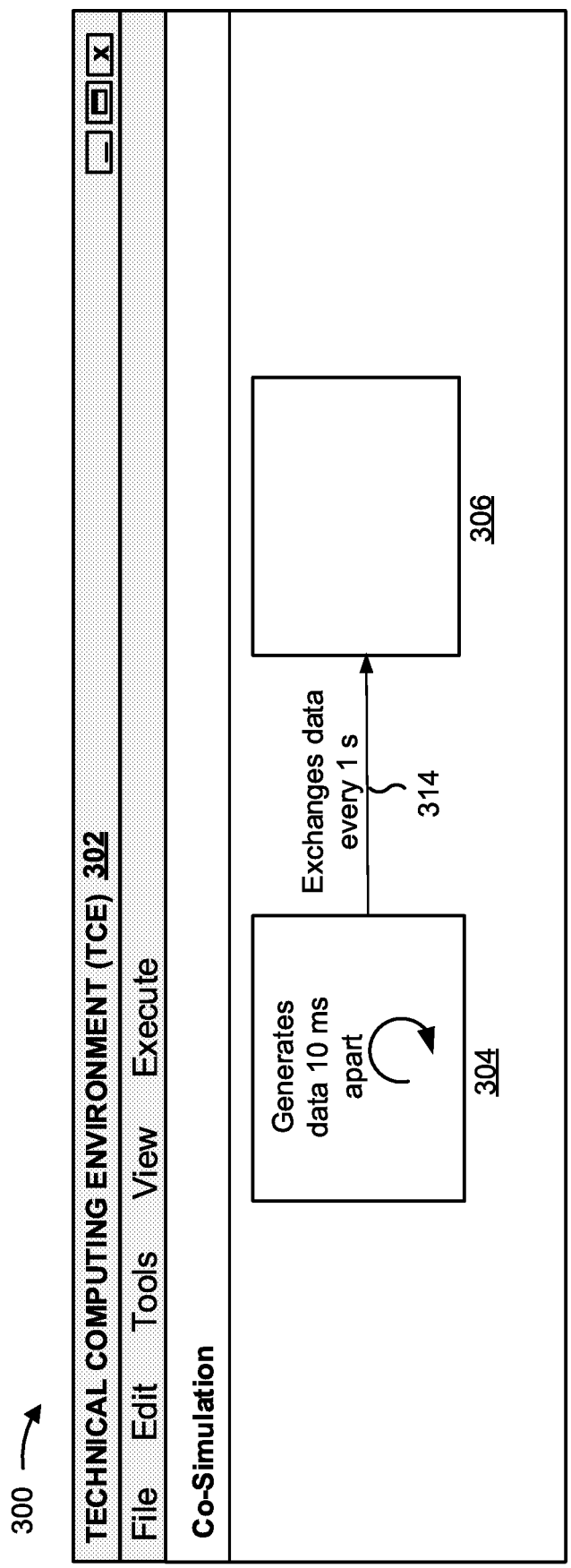
FIGS. 3 and 4 are diagrams of an example implementation of visually distinguishing a line in a model that represents a connection between co-simulation components that communicates data at a rate different than declared for the connection.
Figure 4:
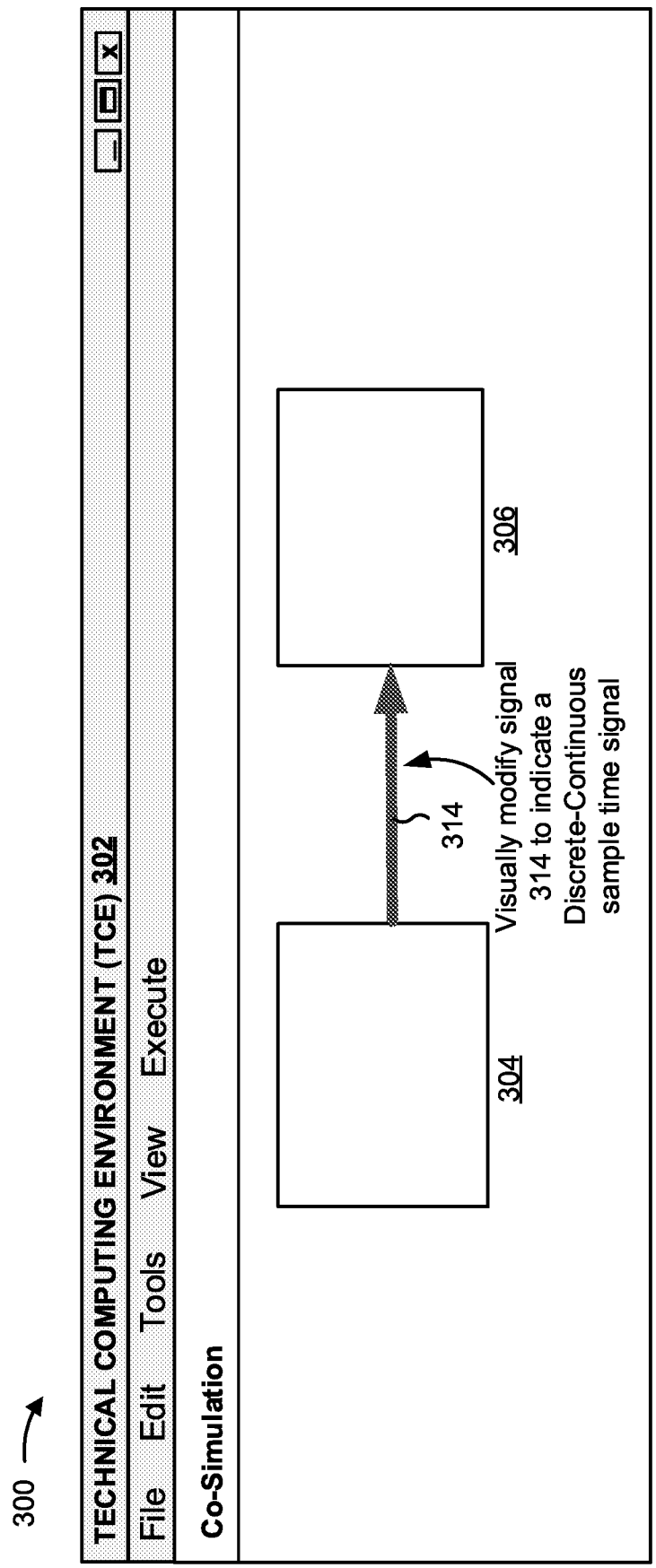

FIGS. 3 and 4 are diagrams of an example implementation 300 of visually distinguishing a line in a model that represents a connection between co-simulation components that communicates data at a communication rate different from a modeled sample rate declared for the connection.

As shown in FIG. 3, TCE 302, or a master execution engine thereof, may analyze a model including co-simulation components 304 and 306 that is to be executed in a co-simulation manner. Based on analyzing the model, TCE 302 determines signal 314 is set as a continuous-time signal.

Further, assume co-simulation component 304 generates data 10 ms apart. For example, between a simulation time (t) of t=0 s and t=2 s co-simulation component 304 may generate a quantity of 201 data results (e.g., a result at t=0 ms, t=10 ms, t=20 ms, t=30 ms, etc.). However, the data results of co-simulation component 304 may be held and artificially sampled at a discrete-time rate of every one second. Accordingly, the data results of co-simulation component 304 are only accessed by a master execution engine of TCE 302 at t=0 s, t=1 s, and t=2 s. Thus, only three data results are communicated rather than all 201 data results that were generated.

Due to the artificial sample rate of one second, signal 314 communicates data at a communication rate different than the modeled sample rate that signal 314 is declared in the model. For example, data may only be exchanged or communicated via signal 314 at a rate of every one second and the intermediate data generated every 10 ms is lost and/or communicated at a later time.

The difference between the rate at which co-simulation component 304 generates data and the rate at which data is actually communicated to co-simulation component 306 may cause inaccuracies in the results generated by co-simulation component 306 based on the signal. For example, assume co-simulation component 306 includes an integrator. A result of performing an integration operation over the time period t=0 s to t=2 s using only the results at t=0 s, t=1 s, and t=2 s, and not all 201 results actually generated between t=0 s and t=2 s, may cause errors in the result of an integration operation (e.g., a less accurate result than if all 200 results were used for the integration operation).

TCE 302 may determine the presence of such an error by determining signal 314 is declared or set at a modeled sample rate (e.g., every 10 ms) that is different than the communication rate for signal 314 (e.g., every one second) based on analyzing the model. TCE 302 identifies signal 314 as a possible source of error or inaccuracy in the model based on data being communicated via the signal at the discrete communication rate and the signal being declared as having a different modeled communication rate.

As shown in FIG. 4, a visual appearance of the signal line representing signal 314 may be visually distinguished from other types of signal lines when the model is displayed based on signal 314 being identified as a signal having a modeled sample rate that differs from the communication rate. For example, signal lines that represent such signals may have a unique color, pattern, shape, weight, or other visual characteristic (e.g., such as flash, shrink and enlarge, change colors, or any other visual characteristic that would allow a user to quickly identify the signal lines) that is unique from all other types of signal lines that represent other types of signals or connections (e.g., lines that do not connect co-simulation components). For instance, a continuous signal may be a first color (e.g., red) and a signal determined to be a signal having a modeled sample rate that differs from the communication rate may be a second color (e.g., orange) different than the first color. Additionally, or alternatively, a visual appearance of the signal line may be visually distinguished by adding a unique visual label to the signal line, such as the words "discrete-continuous" if the signal is determined to have a continuous-time modeled sample rate and a discrete-time communication rate.

In this way, signals that have a modeled sample rate that differs from the communication rate may be automatically identified in a model and visually distinguished from other types of connections between model components. Visually distinguishing such signals may make it easier for a user to identify signals that have a modeled sample rate that is different from an actual communication rate, which may be a source of an error or inaccuracy when the model is executed. Manually identifying these types of signals may be difficult and/or time consuming for the user especially for large models (e.g., a model with thousands or more elements) with numerous connections that each may be a source of the error and where the partitions between co-simulation components may not be visually indicated.

As indicated above, FIGS. 3 and 4 are provided merely as an example. Other examples are possible and may differ from what was described with regard to FIGS. 3 and 4.

Figure 5A:
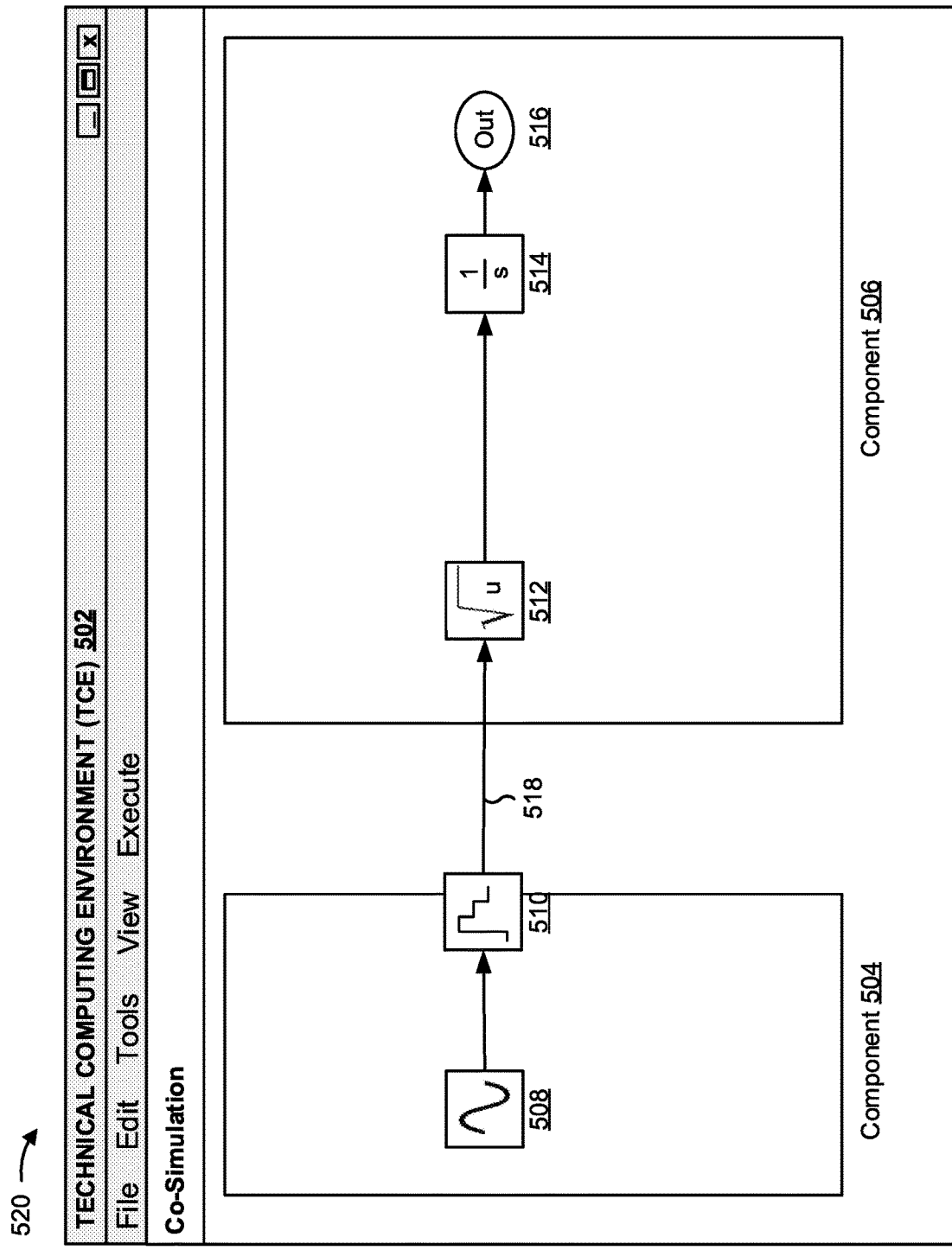
FIGS. 5A-5C are diagrams of an example implementation of determining a compensation location to insert a compensator to compensate for error introduced into execution of a model.
Figure 5B:
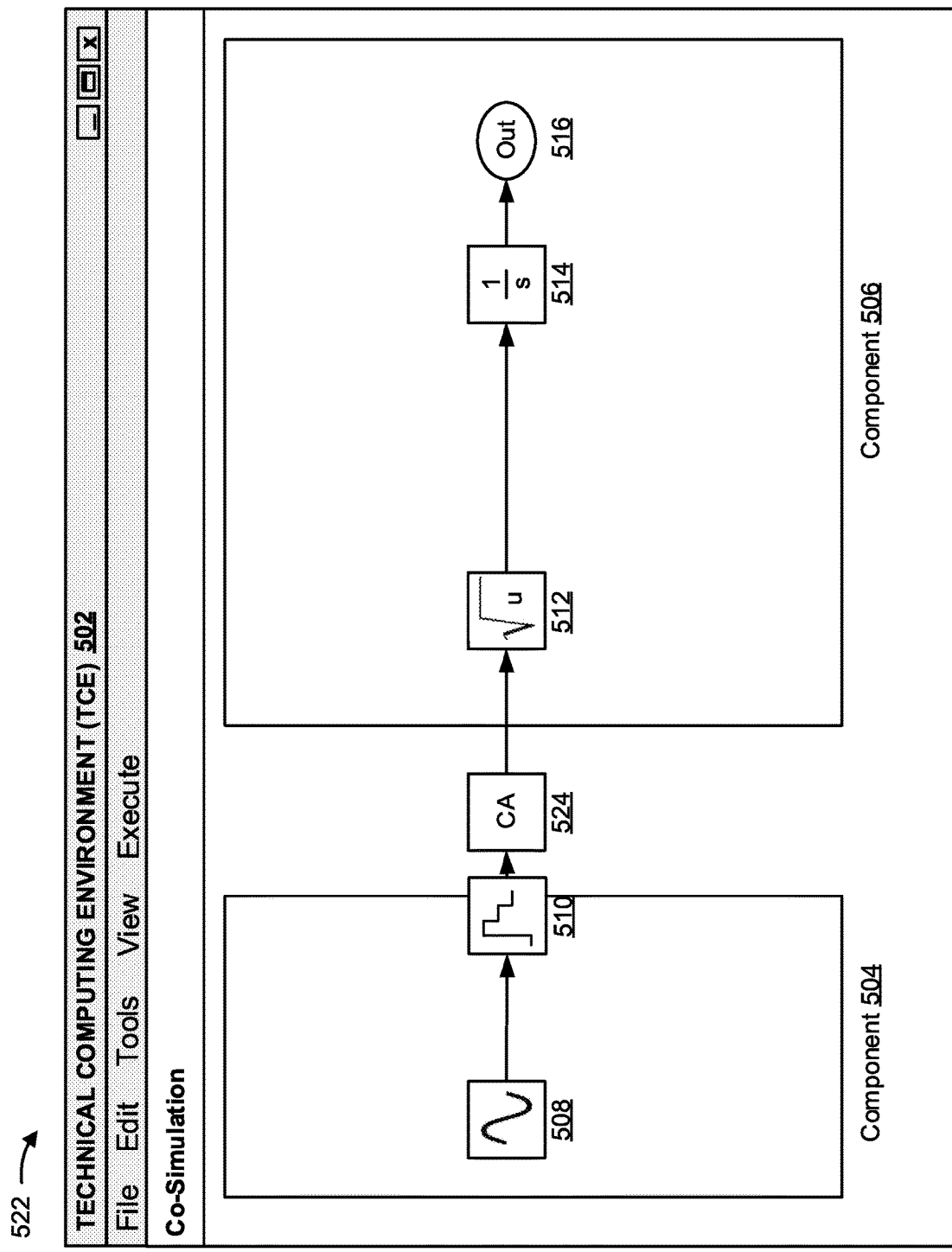
Figure 5C:
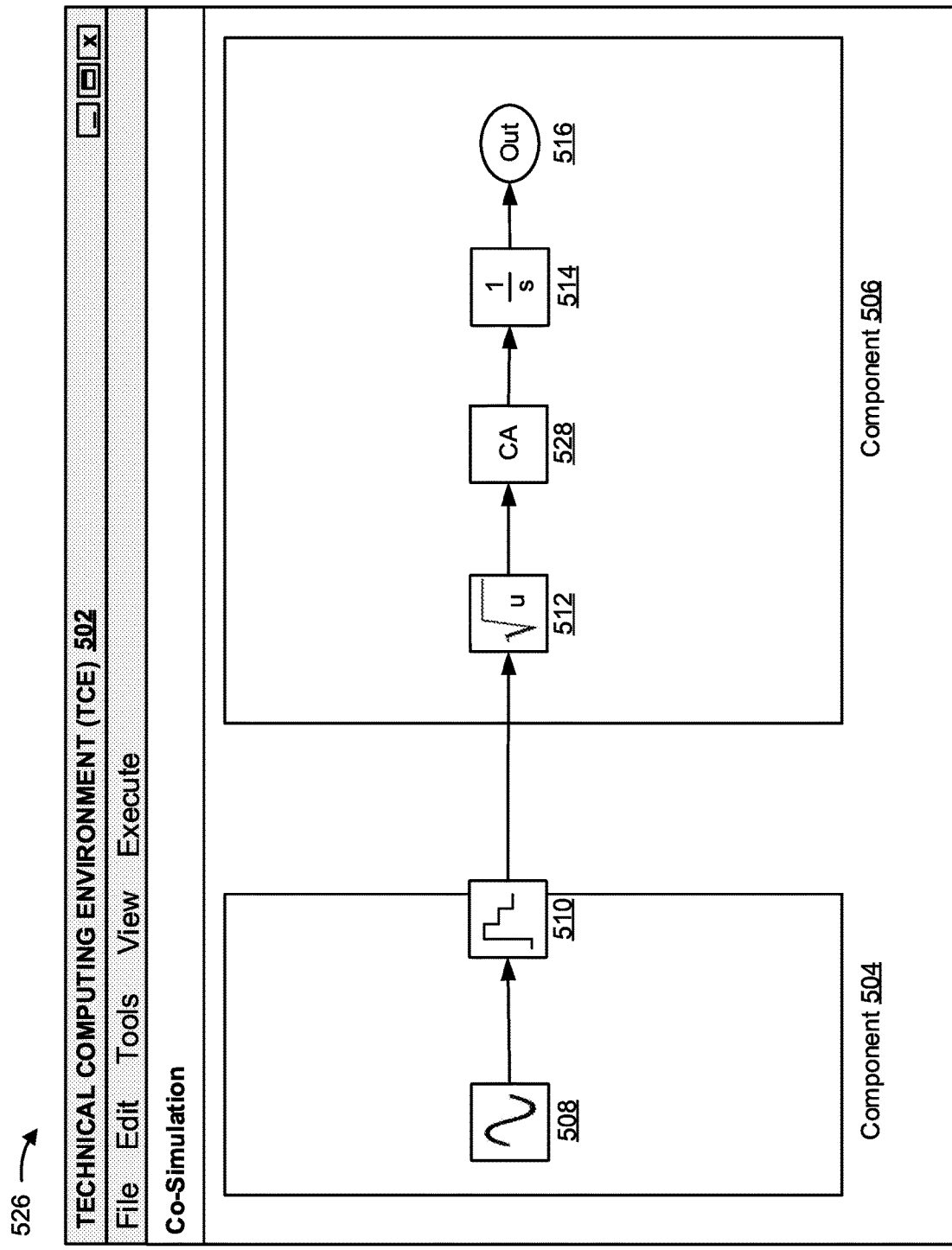

FIGS. 5A-5C are diagrams of an example implementation of determining a compensation location to insert a compensator to compensate for error introduced into execution of a model.

In FIG. 5A, assume TCE 502 analyzes a model to be executed in a co-simulation manner that includes co-simulation component 504 and co-simulation component 506. The analysis of the model may be done as described with respect to FIGS. 1 to 4. Co-simulation component 504 includes a sine wave block 508 solved using a first solver. A zero-order hold block 510 at the boundary of co-simulation component 504 mimics the behavior of co-simulation by discretizing the continuous signal output from sine wave block 508. While zero-order hold block 510 is visually shown in TCE 502, in some implementations, zero-order hold block 510 may be a virtual block that is not visually presented with co-simulation component 504. Co-simulation component 506 includes a square root block 512, an integrator block 514, and an output port 516 that are solved using a second solver.

Sine wave block 508 outputs a continuous-time signal (e.g., a sinusoidal waveform) to zero-order hold block 510 that holds the signal for a sample period. After the sample period, zero-order hold block 510 outputs the signal to square root block 512 that applies a non-linear function (e.g., a square root function) to the signal. Square root block 512 outputs the result to integrator block 514, which outputs a value of an integral of the input from square root block 512. The value output from integrator block 514 is output to output port 516.

Assume that a master execution engine associated with TCE 502 analyzes the model and determines signal 518, which connects co-simulation components 504 and 506, is a signal that has a modeled sample rate that differs from the actual communication rate. For example, signal 518 may have a continuous-time modeled sample rate that is different than the discrete communication rate for signal 518 (e.g., due to zero-order hold block 510).

Implementation 520 in FIG. 5A shows an example where an error that results from co-simulation of the model is not compensated for. On the other hand, implementation 522 in FIG. 5B is an example of explicit compensation where a compensator (CA) 524 that compensates for the error is inserted in the model between co-simulation components 504 and 506 (e.g., at an interface or boundary between co-simulation components 504 and 506). In implementation 522, assume that interfaces for co-simulation components 504 and 506 are limited in that the master execution engine cannot access information related to the particular content of co-simulation components 504 and 506 or related to the functionalities of blocks 508-516. For example, the master execution engine may only be able to access information related to the inputs and outputs of co-simulation components 504 and 506 via the interface, and may only be able to instruct co-simulation components 504 and 506 to move a step forward and/or backwards, update a state, restore a state, or other limited functionality via the interface. In some implementations, co-simulation components 504 and 506 may be Functional Mock-Up Units (FMUs) where the computational operations applied to data within the co-simulation components (e.g., applying a square root function to the signal and then later applying an integrator) and the connectivity between the computational operations are unknown or unavailable to the master execution engine.

Based on information regarding the computational operations of co-simulation components 504 and/or 506 being unavailable to the master execution engine, the master execution engine may determine a compensation location in the model to be at an interface or boundary between co-simulation components 504 and 506. In some implementations, the master execution engine may determine explicit compensation is appropriate when information needed to perform implicit compensation is unavailable. In some implementations, the master execution engine may have access to limited information when the master execution engine is different than the subordinate execution engine used to execute co-simulation component 506. Alternatively, the master execution engine may determine to perform explicit compensation independent of whether the information needed to perform implicit compensation is unavailable. For example, the master execution engine may be programmed to always perform explicit compensation.

As illustrated in implementation 522, a block representing compensator 524 may be inserted in the model between co-simulation components 504 and 506 to perform the explicit compensation. While a visual representation of compensator 524 (e.g., a block, a coupling element that connects blocks or other model elements, etc.) is illustrated in this example, a visual representation of compensator 524 in the model is not required for explicit compensation. For example, the functionality of compensator 524 may be inserted into the model by changing properties of the signal connecting co-simulation components 504 and 506 without inserting a new block. In some implementations, the signal line representing the signal may be modified to visually indicate that compensation has been made and/or that the compensator functionality has been added to the signal. In some implementations, the functionality of compensator 524 may be inserted in an in-memory representation of the model and not shown in the visualization of the model.

In some implementations, compensator 524 may be an algorithm applied to the signal output from co-simulation component 504 that modifies the signal to compensate for the intermediate data points generated by co-simulation component 504 that are lost during co-simulation. The compensation to the signal modifies the signal input into co-simulation component 506. The modification to the signal causes the integration value output from integrator block 514 to be closer to an integration value that would be calculated using all the intermediate data points generated by co-simulation component 504 than if no compensation was performed.

For example, compensator 524 may implement an algorithm based on a Kalman filter. Kalman filtering uses a series of measurements observed over time from the output of co-simulation component 504 and produces estimates of future output values. The Kalman filter produces estimates of current state variables and uncertainties for the current state variables. The outcome of a next measurement from the output of co-simulation component 504 is observed and the estimates are updated/corrected using a weighted average where less weight is given to estimates with higher uncertainty.

Implementation 526 in FIG. 5C is an example of implicit compensation where a compensator 528 that compensates for the error is inserted within a co-simulation component (e.g., co-simulation component 506). Compensator 528 may be the same algorithm as described above with respect to compensator 524.

In implementation 526, assume that an interface for co-simulation component 506 allows a master execution engine to access information related to the particular content and functionalities of blocks 512-516. The information available via the interface may indicate the computational operations applied by co-simulation component 506. In some implementations, the master execution engine may have access to such information when the master execution engine is the same execution engine used to execute co-simulation component 506. However, the master execution engine may have access to such information regardless of whether the same execution is used, and when different execution engines and/or software applications are used.

Assume the master execution engine obtains information via the interface for co-simulation component 506 that indicates a non-linear function (e.g., the square root function) is applied to data before an integration function. Accordingly, the subordinate solver for co-simulation component 506 applies a non-linear function to a signal that transforms the signal before the subordinate solver performs integration on the signal. If a compensation is applied to the signal before being transformed by the non-linear function, the signal may be transformed in a non-linear way that causes the compensation to fail to result in a more accurate integration value being output by integrator block 514 because the non-linear transformation is not accounted for by the compensator. Thus, the master execution engine may determine the compensation should occur at a location within co-simulation component 506 such that the compensation is applied after the non-linear function is applied to the signal and before the integration function is applied to the signal in order to avoid such a failure and produce more accurate results.

In other words, the master execution engine may determine to perform implicit compensation, and insert compensator 528 within co-simulation component 506, based on determining that co-simulation component 506 applies a non-linear function to a signal before an integration function.

In some implementations, the interface for co-simulation component 506 specifies a compensation callback function that allows the master execution engine to insert compensator 528 inside co-simulation component 506. In some implementations, a TCE (e.g., TCE 502), or the master execution thereof, that creates the interface for co-simulation component 506 (e.g., when co-simulation component 506 is created) may determine that co-simulation component 506 applies a non-linear function to the signal before the integration function, and based on this determination, add the callback function to the interface and allow the master execution to invoke the callback function to perform implicit compensation during execution. In other words, the interface may have a particular callback function that allows an input to co-simulation component 506 to be transformed at a particular location by an algorithm. In some implementations, the interface may not natively include the compensation callback function. In such cases, the compensation callback function may be created and added to the interface by the master execution engine and/or software application to provide the interface with the functionality required to perform implicit compensation. Alternatively, the interface for co-simulation component 506 may be originally generated to include the callback function capability. In some implementations, an API specification for the interface may include an indicator (e.g., a flag) that indicates whether the compensation callback function is available. The master execution engine may query this flag to determine if implicit compensation is possible based on whether the flag indicates the compensation callback function is available.

Accordingly, during execution of the model when the master execution engine instructs co-simulation component 506 to make a time step, the master execution engine may include compensator 528 (e.g., a compensation algorithm) as an input in the particular callback function, when calling the callback function, to perform the implicit compensation. An example of the particular callback mechanism will be discussed in more detail with respect to FIGS. 6 and 7.

In this way, a master execution engine may correct for the error introduced into execution of a model executed in a co-simulation manner using explicit compensation and/or implicit compensation.

FIG. 6 is a diagram of an example implementation 600 of code used in FIG. 5C for implicit compensation. The code may be for the subordinate solver (e.g., a Runge-Kutta solver) of co-simulation component 506 in FIG. 5C and executed by the software application that includes the subordinate solver. Code shown in { } is from co-simulation component 504. Assume the following:

Sqrt.U is input of square root block 512;
Sqrt.Y is output of square root block 512;
Integrator.U is input of integrator block 514;
Integrator.X is continuous state of integrator block 514;
Integrator.X1, X2, X3 are temporary intermediate step continuous states of integrator block 514;
Integrator.dX1, dX2, dX3, dX4 are temporary intermediate step derivatives of integrator block 514; and
Out1.Y is output of output port 516.

Compensation location 602 illustrates an example of where compensator 528 may be inserted. Compensator 528 may perform prediction/correction for Integrator.dX1, Integrator.dX2, Integrator.dX3, and Integrator.dX4 based on derivative history of previous communication steps. Compensator 528, and the predictions/corrections, may be implemented as a common offset for dX1, dX2, dX3, and dX4.

As indicated above, FIG. 6 is provided merely as an example. Other examples are possible and may differ from what was described with regard to FIG. 6.

FIG. 7 is a diagram of an example implementation 700 of a callback mechanism for the implicit compensation shown in FIG. 6.

Lines 702 set forth callback function definitions (e.g., for a callback function "afterComputingDerivatives"). "afterComputingDerivatives" may be an example of a compensation callback function that allows an input to a co-simulation component to be compensated at a particular location by a compensator. For example, "afterComputingDerivatives" may allow the compensator to be inserted at compensation location 602 illustrated in FIG. 6 by inserting the compensator after the compute derivatives function(s).

As shown in lines 704, in a master execution engine implementation of "afterComputingDerivates," the master execution engine loops through elements in derivatives in the stage where the master execution engine computes derivatives and performs prediction/correction for variables qualifiable for compensation.

In some implementations, a subordinate solver, for example, may make a numerical integration step and call the callback function (e.g., "afterComputingDerivatives"). This callback function may be implemented by the master execution engine or the master solver and include the compensator (e.g., compensation computations or algorithms) needed based on analysis of the model. The compensator may be executed (e.g., the compensation computations or algorithms may be performed) when the subordinate solver requires the compensation, which is based on analysis of the co-simulation component that is solved by the subordinate solver. Additionally, or alternatively, a different execution engine, TCE, or software application may call the callback function, and possibly at a different time than discussed above based on an analysis of the model determining that the callback is necessary. Thus, during execution, the callback function may be called and implemented by the master execution engine and/or master solver.

As indicated above, FIG. 7 is provided merely as an example. Other examples are possible and may differ from what was described with regard to FIG. 7.

FIGS. 8A-8E are diagrams of an example implementation 800 of data coupling compensation for a frequency domain. Example implementation 800 may be performed rather than, or in addition to, implicit and/or explicit compensation to reduce the error introduced by co-simulation.

In FIG. 8A, assume co-simulation components 802 and 804 are connected by signal 806. An interface for co-simulation component 802 specifies that an output signal from co-simulation component 802 is within frequency range [0,a], where a represents a frequency. An interface for co-simulation component 804 specifies that the interface accepts signals within frequency range [0,b], where b represents a frequency. These frequency ranges may correspond to a determined communication rate determined for signal 806. Assume the modeled sample rate for co-simulation component 802 is ts_a and that the modeled sample rate for co-simulation component 804 is ts_b. Accordingly, the communication rate for the signal differs from the modeled sample rate of the signal.

As shown in FIG. 8B, a time-domain discretization at a boundary between co-simulation components 802 and 804 introduces replication of the spectrum in a frequency domain. As shown in FIG. 8C, an input signal may have a frequency that co-simulation component 804 should ignore because the modeled sample rate is different than the communication rate. The shaded regions in FIGS. 8B and 8C indicate aliasing that may introduce distortion or error in the calculations performed based on the signal.

Since co-simulation component 804 has a higher sampling rate than co-simulation component 802, a rate transition takes place between co-simulation component 802 and 804. High frequency noise will be picked up if signal 806 is directly sent from co-simulation component 802 to co-simulation component 804 through rate transition. FIG. 8D illustrates a possible lossless rate transition for FIG. 8B (where co-simulation component 804 accepts a wider range of frequency than co-simulation component 802). The master execution engine may suppress spectrum outside a span of interest by applying a low-pass filter 808 to remove high frequency signals outside the span of interest (as illustrated in FIG. 8E) which may be a solution to FIG. 8C where a destination block (e.g., co-simulation component 804) has to discard part of the high frequency information from the source block (e.g., co-simulation component 802). By removing the part of the signal outside the span of interest, co-simulation component 804 may compute a better approximation and reduce the error caused by co-simulation. The low pass filter may be applied rather than, or in addition to, the implicit and/or explicit compensation to reduce the error caused by co-simulation.

As indicated above, FIGS. 8A-8E are provided merely as an example. Other examples are possible and may differ from what was described with respect to FIG. 8A-8E.

Figure 9:
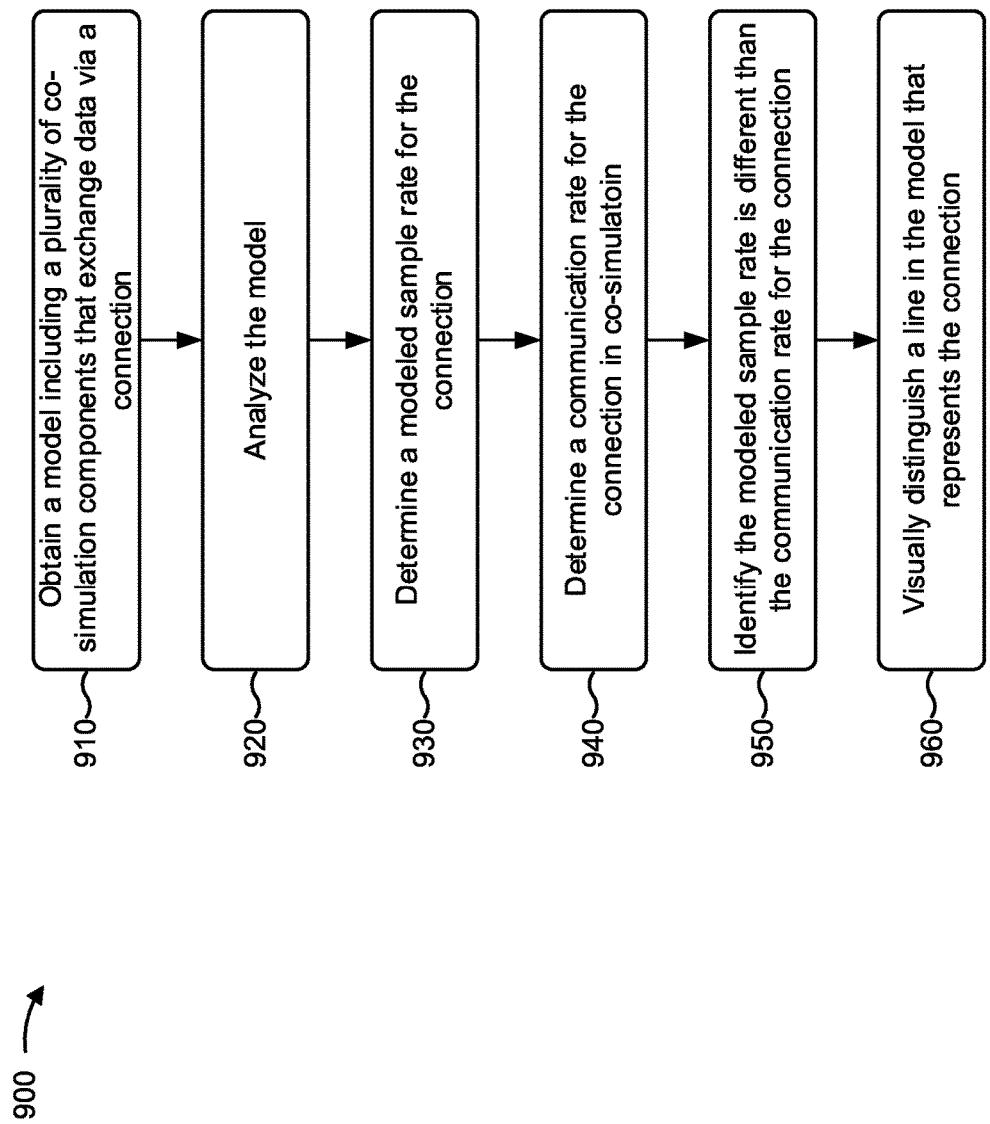
FIG. 9 is a flow chart of an example process for automatically identifying a discrete-continuous sample time connection.

FIG. 9 is a flow chart of an example process 900 for automatically identifying a discrete-continuous sample time connection. In some implementations, one or more process blocks of FIG. 9 may be performed by client device 1210. In some implementations, one or more process blocks of FIG. 9 may be performed by another device or a group of devices separate from or including client device 1210, such as server device 1230.

As shown in FIG. 9, process 900 may include obtaining a model including a plurality of co-simulation components that exchange data via a connection (block 910). For example, client device 1210 may receive a model from another device, create the model, or retrieve the model from a memory.

As further shown in FIG. 9, process 900 may include analyzing the model (block 920). For example, a master execution engine used by client device 1210 may analyze the connection (e.g., a signal) to determine connection properties set for the connection in the model. The connection properties may include a time domain of the connection (e.g., a continuous-time connection, a discrete-time signal, etc.). Additionally, or alternatively, analyzing the model may include analyzing the co-simulation components included in the model. Analyzing a co-simulation component may be done via an interface for the co-simulation component. Client device 1210 may obtain a file (e.g., a XML file) for the co-simulation component that includes flags that characterize properties and/or capabilities of the co-simulation component. The file may indicate a discrete-time sample rate for the co-simulation component.

As further shown in FIG. 9, process 900 may include determining the modeled sample rate for the connection in the model (block 930). For example, client device 1210 may determine the connection is a continuous-time or a discrete-time connection based on the connection parameter obtained by analyzing the model (e.g., a time domain property or a frequency domain property).

As further shown in FIG. 9, process 900 may include determining the communication rate for the connection (block 940). For example, client device 1210 may determine data is exchanged at a discrete-time rate along the connection based on the co-simulation component property indicating a discrete-time sample rate of a co-simulation component that outputs data via the connection. Additionally, or alternatively, client device 1210 may determine the data is communicated at a discrete-time rate along the connection based on the co-simulation component that outputs the data via the connection being executed in a co-simulation manner.

As further shown in FIG. 9, process 900 may include identifying the modeled sample rate is different than the communication rate for the connection (block 950). For example, client device 1210 may identify the signal as a discrete-continues sample time connection based on the connection being declared as a continuous connection in the model and based on data being communicated/exchanged via the connection at a discrete-time rate. Alternatively, client device 1210 may identify the connection has a modeled sample rate that is different than the communication rate based on the modeled sample rate being a different discrete-time rate than the communication rate.

As further show in FIG. 9, process 900 may include visually distinguishing a line in the model that represents the connection (block 960). For example, the line may be given a unique visual appearance that differs from all other types of line used in the model, or capable of being used in the model, based on the connection being identified as a discrete-continuous sample time connection. The unique visual appearance may identify the connection as the discrete-continuous sample time connection. The model, including the line with the unique visual appearance, may be displayed or provided for display (e.g., to another device) by client device 1210.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
FIG. 10 is a flow chart of an example process for inserting a compensator in a model that compensates for error introduced by executing a model in a co-simulation manner.

FIG. 10 is a flow chart of an example process 1000 for inserting a compensator in a model that compensates for error introduced by executing a model in a co-simulation manner. In some implementations, one or more process blocks of FIG. 10 may be performed by client device 1210. In some implementations, one or more process blocks of FIG. 10 may be performed by another device or a group of devices separate from or including client device 1210, such as server device 1230. In some implementations, process 1000 may include process 900 shown in FIG. 9.

As shown in FIG. 10, process 1000 may include identifying error is introduced into execution of a model (block 1002). For example, client device 1210 may make the identification based on the data being communicated via the connection at the discrete-time rate and based on the connection having a different modeled sample rate. For example, client device 1210 may identify the error is introduced in the model based on a discrete-continuous sample time connection being identified in the model at block 950.

As shown in FIG. 10, process 1000 may further include determining whether access to computational operations of a co-simulation component is available (block 1004). For example, client device 1210 may determine whether a master execution engine used to execute the model has access to information indicating internal computational operations of one or more of the co-simulation components that communicate the data via the connection based on whether interfaces for the co-simulation components make the information available.

As shown in FIG. 10, if access to computational operations of a co-simulation component is available (block 1004—YES), process 1000 may further include obtaining information relating to the computational operations applied by a co-simulation component via an interface for the co-simulation component (block 1006). If access to computational operations of a co-simulation component is not available (block 1004—NO), process may 1000 may advance to block 1008.

As shown in FIG. 10, process 1000 may further include determining a compensation location to insert a compensator (block 1008). For example, client device 1210 may determine a compensation location to be between two co-simulation components (e.g., explicit compensation). In some implementations, explicit compensation may be determined if information relating to the computational operations of a destination co-simulation component (e.g., a co-simulation component that receives the data via the connection from another co-simulation component) is not available.

If information relating to the computational operations of a destination co-simulation component is available, client device 1210 may analyze the computational operations and determine whether the destination co-simulation component applies a non-linear operation to data before an integration operation. Additionally, or alternatively, client device 1210 may check a property of the co-simulation components (e.g., identify a flag in the interface for the co-simulation components) that indicates a non-linear operation is applied before an integration operation. If a non-linear operation is applied before an integration operation, client device 1210 may determine the compensation location to be within the destination co-simulation component (e.g., inherent compensation). For example, the compensation location may be determined to be after the non-linear operation and before the integration operation. On the other hand, if a non-linear operation is not applied before an integration operation in the destination co-simulation component, then client device 1210 may perform implicit compensation or explicit compensation.

The compensation location is automatically determined by client device 1210 independently of and without need for user input based on analyzing the connection properties and the co-simulation component properties.

As shown in FIG. 10, if a compensation location is determined to be between co-simulation components (block 1008—EXPLICIT), process 1000 may further include generating a compensator for insertion (block 1010). In some implementations, client device 1210 may automatically select a type of compensator to generate, and generate the compensator based on model information, the error, and/or the type of compensator. Additionally, or alternatively, client device 1210 may present (e.g., display) information indicating the automatically determined compensation location to a user, provide the user with information identifying different types of compensators to choose from and/or receive a user defined compensator via user input, and select a compensator to use based on user input.

As shown in FIG. 10, process 1000 may further include inserting the compensator between co-simulation components (block 1012). For example, client device 1210 may insert the compensator as a connecting element between the co-simulation components in the model.

As shown in FIG. 10, if a compensation location is determined to be inside a co-simulation component (block 1008—IMPLICIT), process 1000 may further include creating a callback function (e.g., a compensation callback function) that allows a master execution engine to insert a compensator inside a co-simulation component (block 1014). And, from this, the information (potentially including a flag that identifies there is a callback function to be used) for the co-simulation component may then be shared (e.g., as an XML representation/file) with another device. Client device 1210 may determine a need for the compensation callback function based on inherent compensation being determined.

As shown in FIG. 10, process 1000 may further include generating the compensator (block 1016). For example, the compensator may be generated in the same manner as described with respect to block 1010.

As shown in FIG. 10, process 1000 may further include inserting the compensator in the model via the callback (block 1018). For example, client device 1210 may insert the compensator inside a co-simulation component by including the compensator in the callback function when the callback function is called.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
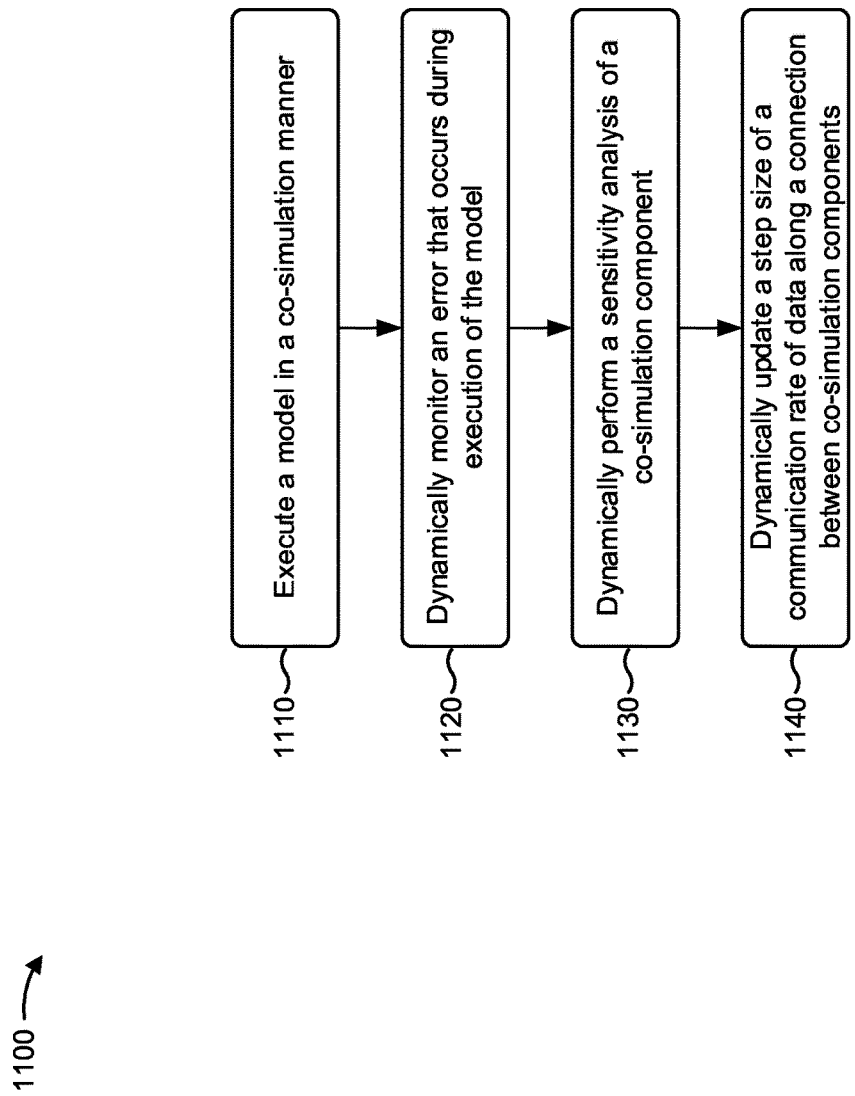
FIG. 11 is a flow chart of an example process for dynamically updating a step size of a communication rate along a discrete-continuous sample rate connection.

FIG. 11 is a flow chart of an example process 1100 for dynamically updating a step size of a communication rate along a discrete-continuous sample rate connection. In some implementations, one or more process blocks of FIG. 11 may be performed by client device 1210. In some implementations, one or more process blocks of FIG. 11 may be performed by another device or a group of devices separate from or including client device 1210, such as server device 1230. In some implementations, process 1100 may include process 900 shown in FIG. 9 and/or process 1000 shown in FIG. 10.

As shown in FIG. 11, process 1100 may include executing a model in a co-simulation manner (block 1110). For example, client device 1210 may execute a model that includes co-simulation components connected via a connection. In some implementations, the connection may be a discrete-continuous sample rate connection and the model may communicate data from the first co-simulation component to the second co-simulation component via the connection at communication steps having a step size. At each communication time step, a compensation is applied by a compensator that compensates for an error occurred during execution of the model in connection with executing the model in a co-simulation manner.

As further shown in FIG. 11, process 1100 may further include dynamically monitoring an error that occurs during execution of the model (block 1120). The error monitored may include the error occurred during execution of the model in connection with executing the model in a co-simulation manner (e.g., the error introduced into execution of the model based on the data being communicated via the connection at the discrete-time rate and based on the connection being declared as the continuous-time connection or a different discrete-time rate Additionally, or alternatively, the error may be an accumulated error that remains after the compensation has been applied and that accumulates over execution phases.

As further shown in FIG. 11, process 1100 may further include dynamically performing a sensitivity analysis of a co-simulation component (block 1130). A sensitivity analysis may determine how uncertainty in an output of a co-simulation component can be attributed to uncertainty in the input of the co-simulation component. When performing the sensitivity analysis, client device 1210 may determine how much a change to an input of a co-simulation component impacts the output of the co-simulation component. Based on the sensitivity analysis, a dynamic sensitivity of the connection may be determined over time based on how sensitive the co-simulation components are that are connected by the connection.

As further shown in FIG. 11, process 1100 may further include dynamically updating a step size of a communication rate along a connection between co-simulation components (block 1140). Client device 1210 may update a step size of the communication rate of data along the connection in the model based on the sensitivity analysis and/or the error. In some implementations, as the sensitivity of the connection increases over time, the step size of the communication rate may be reduced to reduce the possibility of error or inaccuracy in the simulation. On the other hand, as the sensitivity of the connection decreases over time, the step size of the communication rate may be increased to reduce processing resources required for executing the model. Additionally, or alternatively, as the monitored error increases over time, the step size of the communication rate may be reduced to reduce the error. On the other hand, as the monitored error decreases over time, the step size of the communication rate may be increased to reduce processing resources required for executing the model.

Additionally, or alternatively, the master execution engine may set a threshold sensitivity for a connection. If the sensitivity analysis indicates the sensitivity of the connection meets or exceeds the threshold sensitivity, the master execution engine may reduce (or increase) the step size of the communication rate. Likewise, if the monitored error meets or exceeds a threshold error, the master execution engine may reduce (or increase) the step size of the communication rate.

Additionally, or alternatively, the step size of the communication rate may be iteratively adjusted. For example, the step size for the communication rate may be iteratively increased or decreased until a desired sensitivity (e.g., a minimum sensitivity) and/or a threshold sensitivity for the connection is achieved. In some implementations, the step size of the communication rate may be determined based on the sensitivity analysis of a previous step size sensitivity analysis.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

Accordingly, implementations described herein may automatically identify discrete-continuous sample rate signals. The discrete-continuous sample rate signals may be visually distinguished in a displayed model to improve a user's understanding of the execution of the model. Moreover, a compensation location for inserting a compensator may automatically be determined based on identification of discrete-continuous sample rate signals in the model. Thus, the effectiveness of compensators may be improved resulting in more accurate results from the model when executed in a co-simulation manner.

Figure 12:
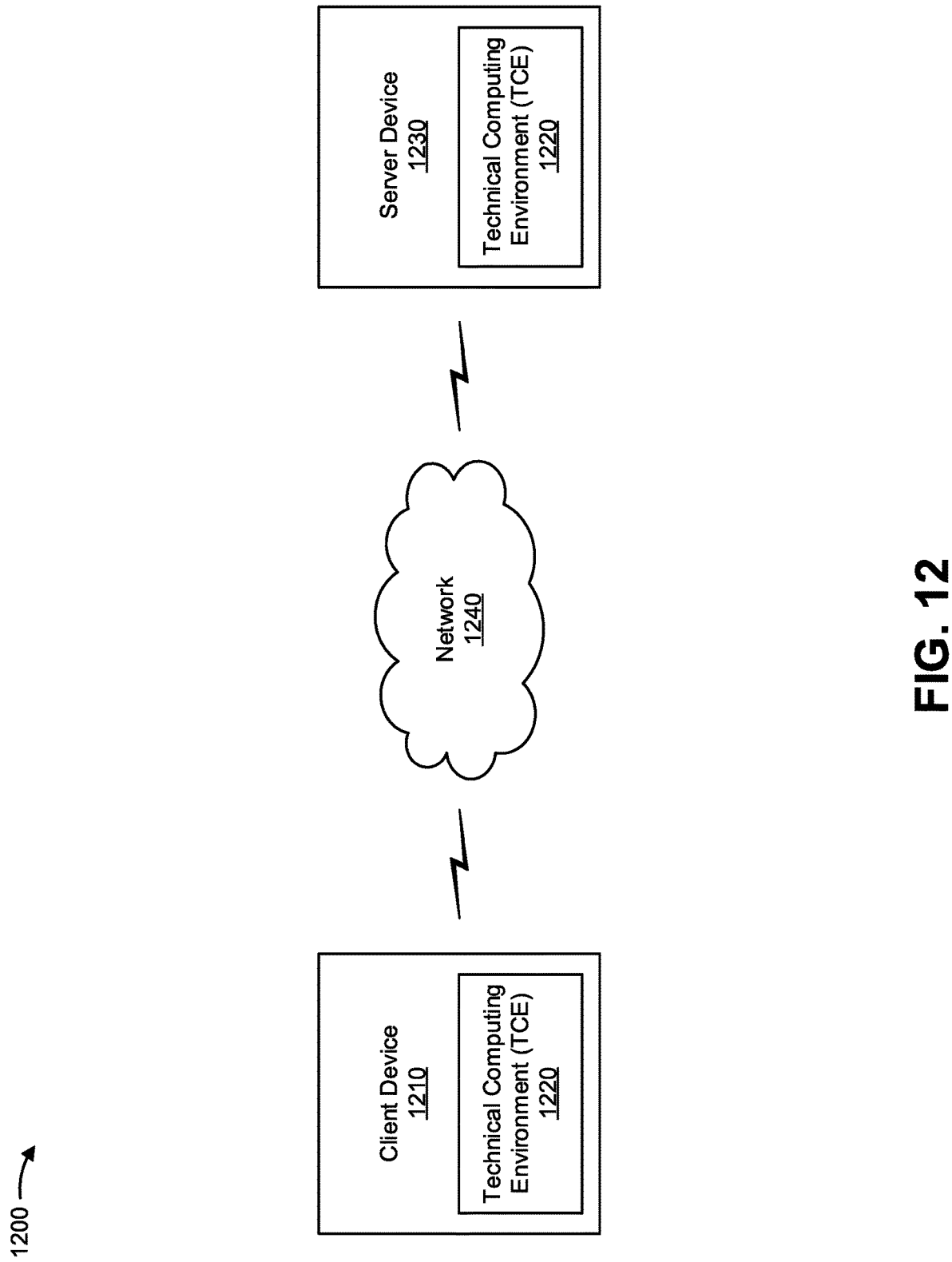
FIG. 12 is a diagram of an example environment in which systems and/or methods, described herein, may be implemented.

FIG. 12 is a diagram of an example environment 1200 in which systems and/or methods, described herein, may be implemented. As shown in FIG. 12, environment 1200 may include a client device 1210, which may include a technical computing environment (TCE) 1220. Furthermore, environment 1200 may include a server device 1230, which may include TCE 1220, and a network 1240. Devices of environment 1200 may interconnect via wired connections, wireless connections, or a combination of wired and wireless connections.

Client device 1210 may include one or more devices capable of receiving, generating, storing, processing, and/or providing information. For example, client device 1210 may include a computing device, such as a desktop computer, a laptop computer, a tablet computer, a mobile phone (e.g., a smart phone, a radiotelephone, etc.), or a similar device. In some implementations, client device 1210 may receive information from and/or transmit information to server device 1230.

Client device 1210 may host TCE 1220. TCE 1220 may include any hardware-based component or a combination of hardware and software-based components that provides a computing environment that allows tasks to be performed (e.g., by users) related to disciplines, such as, but not limited to, mathematics, science, engineering, medicine, and business. TCE 1220 may include a text-based environment (e.g., MATLAB® software by The MathWorks, Inc.), a graphically-based environment (e.g., Simulink® software, State-flow® software, SimEvents® software, Simscape® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment. In some implementations, TCE 1220 may include a Modelica based environment, such as Dymola, MapleSim, OpenModelica, JModelica, etc. Other possible environments may include GT Suite, XLINK by Gamma Technologies, CarMaker by IPG, AVL Model Connect, xMOD, CosiMate. TCE 1220 may include, for example, a graphical programming environment for modeling, simulating, and analyzing multidomain dynamic systems. For example, TCE 1220 may execute a model in a co-simulation manner to generate a behavior of multidomain dynamic systems.

Server device 1230 may include one or more devices capable of receiving, generating, storing, processing, and/or providing information associated with code. For example, server device 230 may include a computing device, such as a server, a desktop computer, a laptop computer, a tablet computer, or a similar device. In some implementations, server device 1230 may host TCE 1220. In some implementations, client device 1210 may be used to access one or more TCEs 1220 running on one or more server devices 1230. For example, multiple server devices 1230 may be used to execute program code (e.g., serially or in parallel), and may provide respective results of executing the program code to client device 1210.

In some implementations, client device 1210 and server device 1230 may be owned by different entities. For example, an end user may own client device 1210, and a third party may own server device 1230. In some implementations, server device 1230 may include a device operating in a cloud computing environment. In this way, front-end applications (e.g., a user interface) may be separated from back-end applications (e.g., program code execution). Additionally, or alternatively, server device 1230 may perform one, more, or all operations described elsewhere herein as being performed by client device 1210.

Network 1240 may include one or more wired and/or wireless networks. For example, network 1240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 12 are provided as an example. In practice, there may be additional devices and/or networks, fewer devices and/or networks, different devices and/or networks, or differently arranged devices and/or networks than those shown in FIG. 12. Furthermore, two or more devices shown in FIG. 12 may be implemented within a single device, or a single device shown in FIG. 12 may be implemented as multiple, distributed devices. Additionally, or alternatively, a set of devices (e.g., one or more devices) of environment 1200 may perform one or more functions described as being performed by another set of devices of environment 1200. In some implementations, client device 1210 and/or server device 1230 may correspond to device 200.

Figure 13:
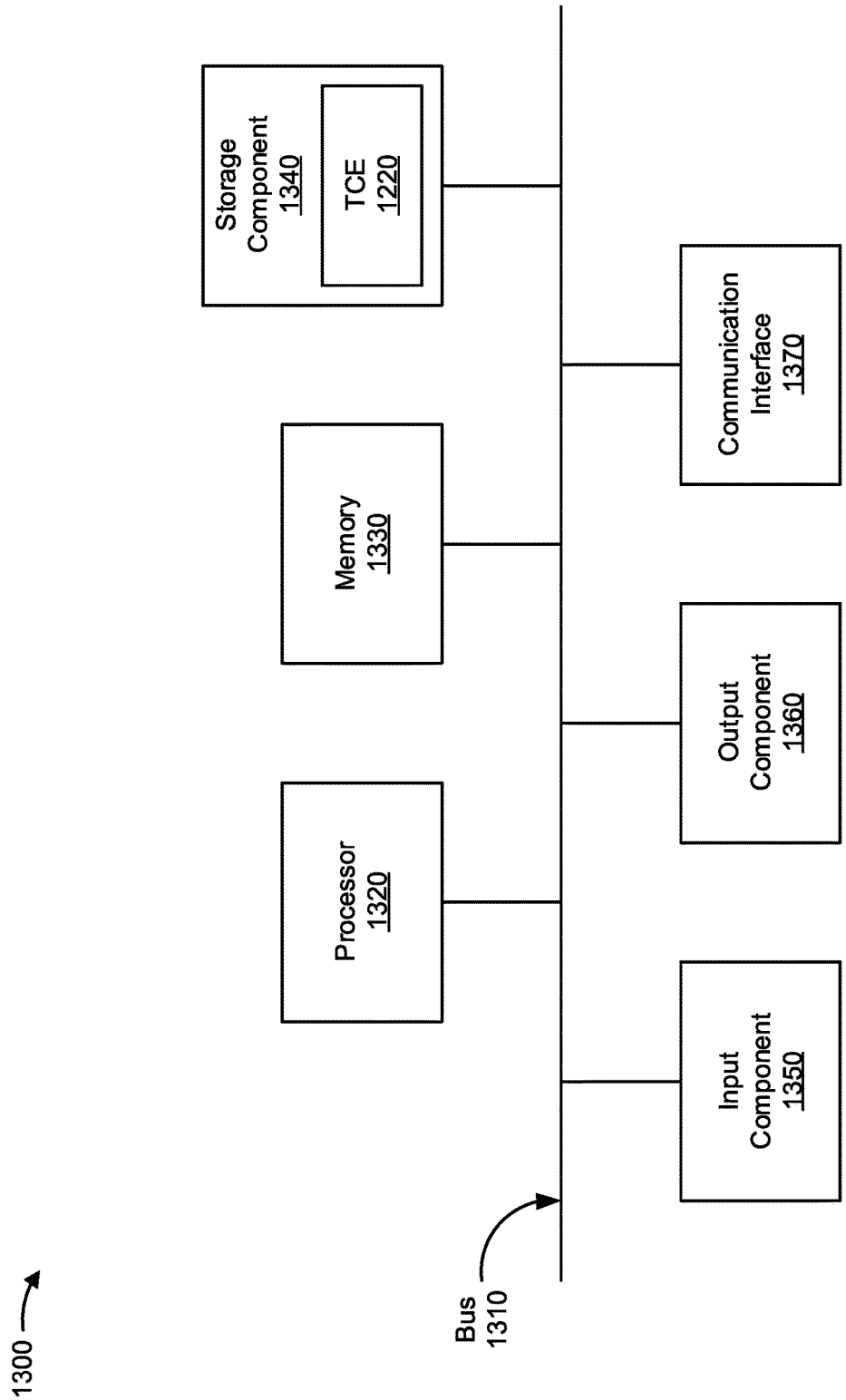
FIG. 13 is a diagram of example components of one or more devices of FIG. 12.

FIG. 13 is a diagram of example components of a device 1300. Device 1300 may correspond to client device 1210, server device 1230, and/or device 200. In some implementations, client device 1210, server device 1230, and/or device 200 may include one or more devices 1300 and/or one or more components of device 1300. As shown in FIG. 13, device 1300 may include a bus 1310, a processor 1320, a memory 1330, a storage component 1340, an input component 1350, an output component 1360, and a communication interface 1370.

Bus 1310 includes a component that permits communication among the components of device 1300. Processor 1320 is implemented in hardware, firmware, or a combination of hardware and software. Processor 1320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 1320 includes one or more processors capable of being programmed to perform a function. Memory 1330 includes a random access memory (RAM), a read only memory (ROM), and/or another type of dynamic or static storage device (e.g., a flash memory, a magnetic memory, and/or an optical memory) that stores information and/or instructions for use by processor 1320.

Storage component 1340 stores information and/or software related to the operation and use of device 1300. For example, storage component 1340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 1350 includes a component that permits device 1300 to receive information, such as via user input (e.g., a touch screen display, a keyboard, a keypad, a mouse, a button, a switch, and/or a microphone). Additionally, or alternatively, input component 1350 may include a sensor for sensing information (e.g., a global positioning system (GPS) component, an accelerometer, a gyroscope, and/or an actuator). Output component 1360 includes a component that provides output information from device 1300 (e.g., a display, a speaker, and/or one or more light-emitting diodes (LEDs)).

Communication interface 1370 includes a transceiver-like component (e.g., a transceiver and/or a separate receiver and transmitter) that enables device 1300 to communicate with other devices, such as via a wired connection, a wireless connection, or a combination of wired and wireless connections. Communication interface 1370 may permit device 1300 to receive information from another device and/or provide information to another device. For example, communication interface 1370 may include an Ethernet interface, an optical interface, a coaxial interface, an infrared interface, a radio frequency (RF) interface, a universal serial bus (USB) interface, a Wi-Fi interface, a cellular network interface, or the like.

Device 1300 may perform one or more processes described herein. Device 1300 may perform these processes (e.g., a computer-implemented method) in response to processor 1320 executing software instructions stored by a non-transitory computer-readable medium, such as memory 1330 and/or storage component 1340. A computer-readable medium is defined herein as a non-transitory memory device. A memory device includes memory space within a single physical storage device or memory space spread across multiple physical storage devices.

Software instructions may be read into memory 1330 and/or storage component 1340 from another computer-readable medium or from another device via communication interface 1370. When executed, software instructions stored in memory 1330 and/or storage component 1340 may cause processor 1320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 13 are provided as an example. In practice, device 1300 may include additional components, fewer components, different components, or differently arranged components than those shown in FIG. 13. Additionally, or alternatively, a set of components (e.g., one or more components) of device 1300 may perform one or more functions described as being performed by another set of components of device 1300.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that can be automatically processed (e.g., compiled or synthesized) to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.) binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an XML file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   presenting, by one or more technical computing environments, a user interface (UI) depicting a model including a first co-simulation component and a second co-simulation component, where
   the first co-simulation component outputs data to the second co-simulation component via a connection,
   the connection is declared as a continuous connection for input of the data into the second co-simulation component, and
   the one or more technical computing environments include a first solver for solving the first co-simulation component and a second solver for solving the second co-simulation component, the first and second solvers being different;
   determining, by the one or more technical computing environments, a modeled sample rate for the connection declared as the continuous connection;
   determining, by the one or more technical computing environments, the data is communicated from the first co-simulation component to the second co-simulation component via the connection at a discrete-time communication rate that is different from the modeled sample rate for the connection declared as the continuous connection;

identifying, by the one or more technical computing environments, that an error is introduced into execution of the model based on the data being communicated via the connection at the discrete-time communication rate that is different from the modeled sample rate for the connection declared as the continuous connection; and visually distinguishing, by the one or more technical computing environments, an appearance of a first line included in the model depicted on the UI and representing the connection from an appearance of a second line included in the model, based on the determining by the one or more technical computing environments that the data being communicated via the connection at the discrete-time communication rate and that the connection is declared as the continuous connection.

2. The method of claim 1, wherein the first co-simulation component and the second co-simulation component use at least one of different execution engines or different software applications.

3. The method of claim 1, wherein the appearance of the visually distinguished first line indicates the data is communicated via the connection at the discrete-time communication rate and the connection is declared as the continuous connection.

4. The method of claim 1, wherein the connection is a signal.

5. The method of claim 1, further comprising:
determining first properties of the first co-simulation component via a first interface of the first co-simulation component; and
determining second properties of the second co-simulation component via a second interface of the second co-simulation component,
wherein the determining the data is communicated at the discrete-time communication rate via the connection is based on at least one of the first properties of the first co-simulation component or the second properties of the second co-simulation component.

6. The method of claim 1, wherein the determining the modeled sample rate for the connection includes:
obtaining information indicating a modeled sample rate of the first co-simulation component via at least one of a functional mock-up interface or an S-function interface.

7. The method of claim 1, wherein the appearance of the first line is visually distinguished from the appearance of the second line through the use of at least one of a color, a pattern, a shape, a weight, an animation, a size or a label.

8. One or more non-transitory computer-readable media, having stored thereon instructions that, when executed by a computing device, cause the computing device to perform operations comprising:
presenting, by one or more technical computing environments, a User Interface (UI) depicting a model including a first co-simulation component and a second co-simulation component, where
the first co-simulation component outputs data to the second co-simulation component via a connection,
the connection is declared as a continuous connection for input of the data into the second co-simulation component, and
the one or more technical computing environments include a first solver that solves the first co-simulation component and a second solver that solves the second co-simulation component, the first and second solvers being different;

determining, by the one or more technical computing environments, a modeled sample rate for the connection declared as the continuous connection;

determining, by the one or more technical computing environments, the data is communicated from the first co-simulation component to the second co-simulation component via the connection at a discrete-time communication rate that is different from the modeled sample rate for the connection declared as the continuous connection;

identifying, by the one or more technical computing environments, that an error is introduced into execution of the model based on the data being communicated via the connection at the discrete-time communication rate that is different from the modeled sample rate for the connection declared as the continuous connection; and visually distinguishing, by the one or more technical computing environments, an appearance of a first line included in the model depicted on the UI and representing the connection from an appearance of a second line included in the model, based on the determining by the one or more technical computing environments that the data being communicated via the connection at the discrete-time communication rate and that the connection is declared as the continuous connection.

9. The one or more non-transitory computer-readable media of claim 8, wherein the first co-simulation component and the second co-simulation component use at least one of different execution engines or different software applications.

10. The one or more non-transitory computer-readable media of claim 8, wherein the appearance of the visually distinguished first line indicates the data is communicated via the connection at the discrete-time communication rate and the connection is declared as the continuous connection.

11. The one or more non-transitory computer-readable media of claim 8, wherein the connection is a signal.

12. The one or more non-transitory computer-readable media of claim 8, wherein the instructions cause the computing device to perform operations further comprising:
determining first properties of the first co-simulation component via a first interface of the first co-simulation component; and
determining second properties of the second co-simulation component via a second interface of the second co-simulation component,
wherein the determining the data is communicated at the discrete-time communication rate via the connection is based on at least one of the first properties of the first co-simulation component or the second properties of the second co-simulation component.

13. The one or more non-transitory computer-readable media of claim 8, wherein the determining the modeled sample rate for the connection includes:
obtaining information indicating a modeled sample rate of the first co-simulation component via at least one of a functional mock-up interface or an S-function interface.

14. The one or more non-transitory computer-readable media of claim 8, wherein the appearance of the first line is visually distinguished from the appearance of the second line through the use of at least one of a color, a pattern, a shape, a weight, an animation, a size or a label.

15. An apparatus comprising:
one or more memories storing a model including a first co-simulation component and a second co-simulation component, where
the first co-simulation component outputs data to the second co-simulation component via a connection, and
the connection is declared as a continuous connection for input of the data into the second co-simulation component; and
one or more processors coupled to the one or more memories, the one or more processors configured to run one or more technical computing environments (TCEs) including a first solver for solving the first co-simulation component and a second solver for solving the second co-simulation component where the first and second solvers are different, where the one or more TCEs:
present the model on a User Interface (UI);
analyze the model;
determine a modeled sample rate for the connection being declared as the continuous connection based on the analyzing the model;
determine the data is communicated from the first co-simulation component to the second co-simulation component via the connection at a discrete-time communication rate that is different from the modeled sample rate for the connection declared as the continuous connection based on the analyzing the model;
identify that an error is introduced into execution of the model based on the data being communicated via the connection at the discrete-time communication rate that is different from the modeled sample rate for the connection declared as the continuous connection; and
visually distinguish on the UI an appearance of a first line included in the model and representing the connection from an appearance of a second line included in the model, based on the data being communicated via the connection at the discrete-time communication rate and the connection declared as the continuous connection.

16. The apparatus of claim 15, wherein the first co-simulation component and the second co-simulation component use at least one of different execution engines or different software applications.

17. The apparatus of claim 15, wherein the appearance of the visually distinguished first line indicates the data is communicated via the connection at the discrete-time communication rate and the connection is declared as the continuous connection.

18. The apparatus of claim 15, wherein the one or more processors are further configured to:
determine first properties of the first co-simulation component via a first interface of the first co-simulation component; and
determine second properties of the second co-simulation component via a second interface of the second co-simulation component,
wherein the determining the data is communicated at the discrete-time communication rate via the connection is based on at least one of the first properties of the first co-simulation component or the second properties of the second co-simulation component.

19. The apparatus of claim 15, wherein the analyzing the model includes:
obtaining information indicating a modeled sample rate of the first co-simulation component via at least one of a functional mock-up interface or an S-function interface.

* * * * *

UNITED STATES PATENT AND TRADEMARK OFFICE
CERTIFICATE OF CORRECTION

PATENT NO. : 11,966,675 B2
APPLICATION NO. : 17/529742
DATED : April 23, 2024
INVENTOR(S) : Tao Cheng et al.

Page 1 of 1

It is certified that error appears in the above-identified patent and that said Letters Patent is hereby corrected as shown below:

In the Claims

Claim 15:
Column 25, Line 22 reads:
"being declared as the continuous connection based"
Should read:
--declared as the continuous connection based--

Signed and Sealed this
First Day of April, 2025

Coke Morgan Stewart
*Acting Director of the United States Patent and Trademark Office*